(12) United States Patent
Tobiason et al.

(10) Patent No.: US 7,053,362 B2
(45) Date of Patent: May 30, 2006

(54) ABSOLUTE POSITION MINIATURE GRATING ENCODER READHEAD USING FIBER OPTIC RECEIVER CHANNELS

(75) Inventors: Joseph D. Tobiason, Woodinville, WA (US); Kim W. Atherton, Kirkland, WA (US)

(73) Assignee: Mitutoyo Corporation, Kawasaki (JP)

( * ) Notice: Subject to any disclaimer, the term of this patent is extended or adjusted under 35 U.S.C. 154(b) by 257 days.

(21) Appl. No.: 10/428,238

(22) Filed: May 2, 2003

(65) Prior Publication Data
US 2004/0217268 A1 Nov. 4, 2004

(51) Int. Cl.
*G01B 9/02* (2006.01)

(52) U.S. Cl. .............................. 250/231.16; 250/237 R

(58) Field of Classification Search ...............................
250/231.13–231.18, 237 G, 237 R, 227.11;
341/11, 13, 1

See application file for complete search history.

(56) References Cited

U.S. PATENT DOCUMENTS

| | | | |
|---|---|---|---|
| 4,162,399 A * | 7/1979 | Hudson | 250/231.14 |
| 4,733,071 A | 3/1988 | Tokunaga | |
| 5,053,715 A | 10/1991 | Andermo | |
| 5,886,519 A | 3/1999 | Masreliez et al. | |
| 5,909,283 A | 6/1999 | Eselun | |
| 2004/0011948 A1 | 1/2004 | Tobiason | |

OTHER PUBLICATIONS

Cowley, J.M., and A.F. Moodie, "Fourier Images: I—The Point Source," May 1, 1957, *Proc. Phys. Soc. B* 70:486-496.
Patorski, K., "The Self-Imaging Phenomenon and Its Applications," in E. Wolf, (ed.), *Progress in Optics XXVII*, Elsevier Science Publishers B.V., Amsterdam, 1989, pp. 3-108.

* cited by examiner

*Primary Examiner*—Thanh X. Luu
(74) *Attorney, Agent, or Firm*—Christensen O'Connor Johnson Kindness PLLC

(57) ABSTRACT

An absolute position fiber optic encoder readhead having multiple readhead portions for sensing the displacement of respective scale grating tracks of a scale is disclosed. The detector channels of the readhead portions are fiber optic detector channels having respective phase grating masks. The fiber optic encoder readhead portions are configured to detect the displacement of a self-image of a respective scale grating track of the scale. In various exemplary embodiments, the fiber optic readhead portions are constructed according to various design relationships that provide a relatively high signal-to-noise ratio. Accordingly, high levels of displacement signal interpolation may be achieved, allowing submicrometer displacement measurements. The fiber optic encoder readhead portions may be assembled in a particularly accurate and economical manner and may be provided in a package with dimensions on the order of 1–2 millimeters, resulting in a very small overall absolute readhead dimension that is dependent on the number of readhead portions that are incorporated. Optical fiber receiver channels carrying binary optical signals derived from a scale code track may be provided in the readhead, to provide an extended absolute measurement range.

32 Claims, 10 Drawing Sheets

ABSOLUTE POSITION MINIATURE GRATING ENCODER READHEAD USING FIBER OPTIC RECEIVER CHANNELS

FIELD OF THE INVENTION

This invention relates generally to displacement sensing optical encoders, and more particularly to an absolute position optical encoder utilizing optical fibers as receiver elements to provide an ultracompact high accuracy absolute position system.

BACKGROUND OF THE INVENTION

Various movement or position encoders for sensing linear, rotary or angular movement are currently available. These encoders are generally based on either optical systems, magnetic scales, inductive transducers, or capacitive transducers. Certain of these encoders are designed for making relative, and not absolute, measurements. In such relative position encoders, measurements are typically made by sensing the relative change in position of the scales with respect to a reference position, which requires a continuous sensing of the change in the scale pattern so that repetitions of the pattern can be counted. The relative measurements require that a new reference or zero position be established before every measurement, which makes such devices relatively inconvenient to use.

In general, the rate at which the scales of relative measurement devices can be displaced with respect to each other is limited by the speed of the signal processing which can be accomplished. On one hand, if the scales are displaced too quickly, miscounting can occur. On the other hand, increasing the allowable scale displacement speed entails the use of high frequency signals and sophisticated signal processing circuitry, which substantially increases the cost of the measurement devices.

For optical encoders, a number of relative position systems have been developed. One recent system utilizing fewer parts than most previous systems is disclosed in U.S. Pat. No. 5,909,283, to Eselun. The system described in the '283 patent has a grating scale and readhead including a point source (laser diode in readhead), a Ronchi grating or holographic element, and a photodetector array. As described, the point source results in interference fringes having a spacing equal to that of the scale. The interference fringe light is transmitted through the Ronchi grating or holographic element to the photodetector array. The photodetector array is arranged to derive four channels of quadrature signals from the transmitted fringe light. In addition to being a relative position system, another drawback of the system described in the '283 patent is that the resulting encoder is of a size that is relatively large or prohibitive for a number of applications.

Another type of relative position optical encoder is disclosed in U.S. Pat. No. 4,733,071, to Tokunaga. The system described in the '071 patent has a code member scale, and an optical sensor head comprising an optical fiber tip light emitter and two optical fiber tip receptors closely arranged along the code member measuring axis. The optical sensor head is rotated (yawed) to adjust phase difference between the two optical fiber tip receptors. However, the accuracy of the resulting encoder is relatively crude.

SUMMARY OF THE INVENTION

The present invention is directed to providing an encoder that overcomes the foregoing and other disadvantages. More specifically, the present invention is directed to an absolute position optical encoder that is of extremely small size while providing very high accuracy, in addition to having a number of other desirable features.

A fiber optic encoder readhead with multiple readhead portions for sensing the absolute displacement of a scale with multiple scale grating tracks is disclosed. Each readhead portion corresponds to a respective scale grating track of the scale. The readhead portions include a light source for transmitting light to the multiple scale grating tracks of the scale and detector channels within each of the readhead portions for receiving light from the respective corresponding scale grating track of the scale. In accordance with one aspect of the invention, the detector channels of the encoder readhead are fiber optic detector channels.

In addition to the fact that the previously disclosed '283 patent is directed only to a relative rather than absolute position system, the electronic readhead receivers (photodetectors) such as disclosed in the '283 patent suffer limitations in converting the high frequency detector signals associated with high speed scale motion and transmitting those signals over long cables without significant signal loss or interference. In addition, electronic photodetectors and the associated circuit connections contribute to readheads that are too large for many potential encoder applications, particularly where multiple readhead portions are being used in a single readhead. It will be appreciated that the fiber optic detector channels of the present invention overcome these limitations.

In accordance with another aspect of the invention, the absolute position fiber optic encoder readhead detects the locations of the multiple scale grating tracks of a scale using the respective corresponding readhead portions, each having multiple fiber optic detector channels having respective phase grating masks. In addition to the fact that the previously discussed '071 patent is directed only to a relative rather than absolute position system, the optical fiber tip receptors such as those disclosed in the '071 patent have insufficient spatial resolution for fine phase signal discrimination if they have a large diameter, and gather too little light to provide a good signal if they have a small diameter. Thus, their accuracy is limited. It will be appreciated that the fiber optic detector channels of the present invention overcome these and other limitations to provide high accuracy.

In accordance with another aspect of the invention, scale grating track images detected by the multiple fiber optic detector channels of the readhead portions are self-images, also known by other names such as Talbot images, which provide for relatively robust alignment tolerances and high resolution.

In accordance with another aspect of the invention, the absolute position fiber optic encoder readhead is constructed according to a design relationship based on an input aperture size of the fiber optic detector channels, to insure relatively strong signals and enhanced accuracy.

In accordance with a separate aspect of the invention, the fiber optic detector channels of the readhead portions are arranged in balanced pairs, to provide enhanced accuracy.

In accordance with a further aspect of the invention, 3 balanced pairs of fiber optic detector channels within each of the readhead portions are signal processed in a manner that provides enhanced accuracy.

In accordance with a separate aspect of the invention, the light source for each of the readhead portions is provided by an optical fiber, to provide an all-optical readhead, free of all limitations and costs associated with electronic assembly and electronic signals in an encoder readhead.

In accordance with a separate aspect of the invention, the various optical fibers of the absolute position fiber optic encoder are selected from various types such that the encoder measurement accuracy is relatively unaffected by bending of the fiber optic readhead cable.

In accordance with a separate aspect of the invention, various embodiments of the absolute position fiber optic encoder readhead are constructed in a particularly economical, accurate and compact manner.

In accordance with a separate aspect of the invention, the absolute position fiber optic encoder readhead is constructed such that it may be inserted into a standard commercially available fiber optic connector configuration.

In accordance with a separate aspect of the invention, an optical fiber readhead is constructed to provide an additional plurality of optical fiber receiver channels carrying binary optical signals derived from one or more binary code tracks. The optical fiber receiver channels carrying the binary optical signals are combined in the readhead with the multiple fiber optic detector channels that determine the high resolution displacement based on grating track self-images, in order to provide an extended high resolution absolute measurement range.

In accordance with a separate aspect of the invention, a light deflecting element is provided to deflect the readhead light path between the basic readhead elements of the readhead portions and the respective scale tracks of the scale, such that the operable mounting orientation of the readhead relative to the scale is changed.

In accordance with a separate aspect of the invention, in one embodiment a remote interface box is utilized that contains appropriate electronic light sources and photodetectors that interface with the fiber optics to and from one or more fiber optic readhead portions according to this invention, and converts received optical signals to a form suitable for further signal processing and readhead position determination.

Hence, the invention overcomes the disadvantages of prior art optical displacement sensing devices and provides new application possibilities with an absolute position, ultracompact, highly accurate, economical and high speed configuration.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
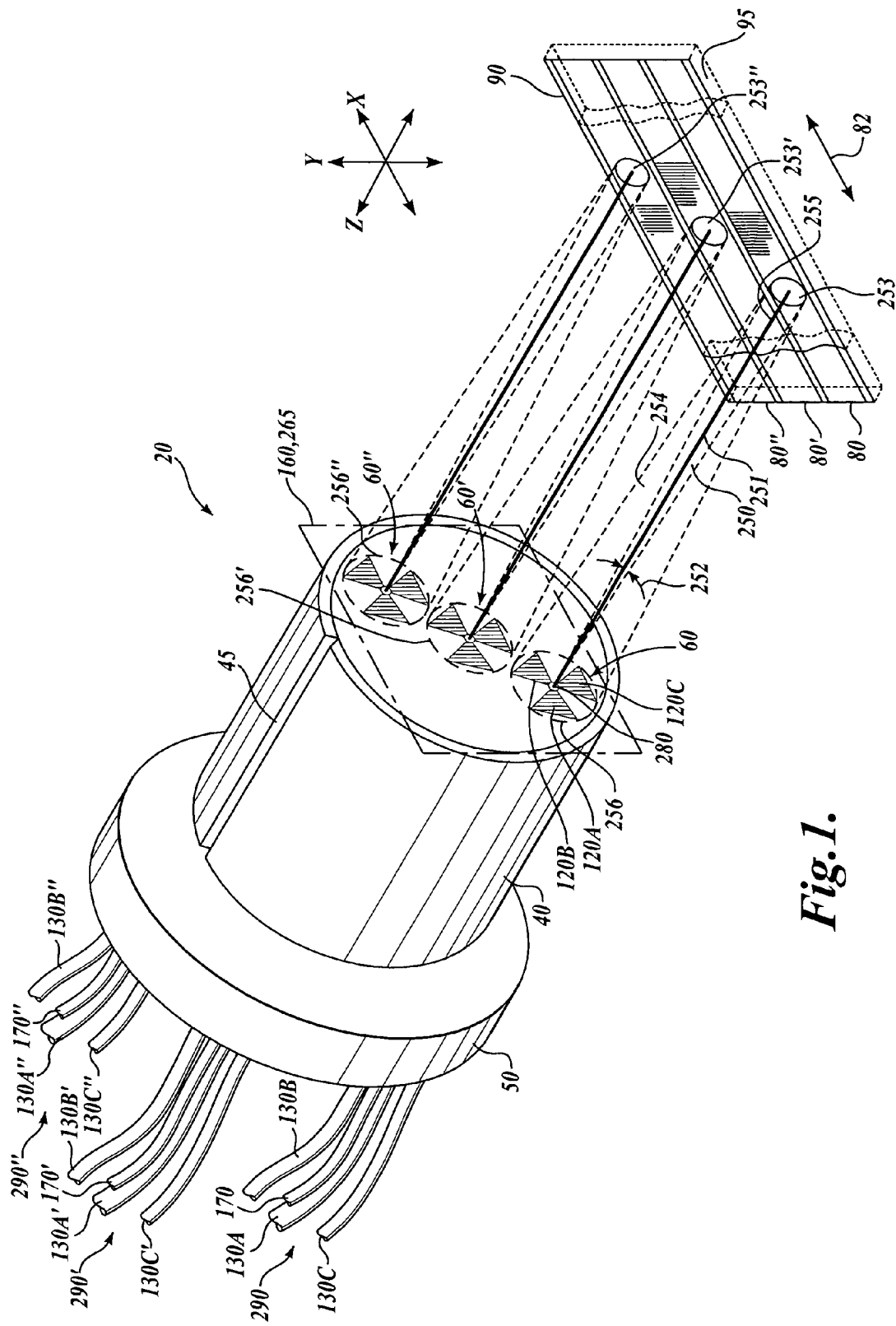
FIG. 1 is an isometric view of a first generic embodiment of an absolute position fiber optic readhead arrangement according to this invention.

FIG. 1 shows a first generic embodiment of an absolute position fiber optic readhead arrangement 20 according to this invention. As shown in FIG. 1, the absolute position fiber optic readhead arrangement 20 includes a ferrule 40 which has an alignment groove 45 and an alignment collar 50, and which encases three readhead portions 60, 60', and 60". The readhead portions 60, 60', and 60" may be formed in accordance with the teachings of U.S. patent application Ser. No. 10/298,312, entitled "High Accuracy Miniature Grating Encoder Readhead Using Fiber Optic Receiver Channels," filed Nov. 15, 2002, which is commonly assigned and hereby incorporated by reference in its entirety. As will be described in more detail below, each of the readhead portions 60, 60', and 60" corresponds to a scale track 80, 80', and 80", respectively, which are included on a scale 90, which is formed on a substrate 95. In one embodiment, as part of the absolute position system the three scale tracks 80, 80', and 80" may be fabricated with respective grating pitches or wavelengths $\lambda_1$, $\lambda_2$, and $\lambda_3$, and may be used to determine fine, medium, and course resolution measurements, as described in more detail in the teachings related to absolute position systems found in U.S. Pat. No. 5,886,519, which is commonly assigned and hereby incorporated by reference in its entirety.

As will be described in more detail below, each of the readhead portions 60, 60', and 60" is coupled to a fiber optic channel set 290 that includes three receiver optical fibers 130 and one illumination fiber 170. Thus, the fiber optic channel set 290 for the readhead portion 60 includes receiver optical fibers 130a, 130b, and 130c, and an illumination fiber 170. While each of the readhead portions 60, 60', and 60" contain similar components, for the remainder of this application the components for the readhead portions 60' and 60" will generally not be described in detail, as it will be understood that except for the variations in respective phase mask dimensions described herein, the components for readhead portion 60 are repeated for the readhead portions 60', except with a single prime designation, and for the readhead portion 60", except with a double prime designation. As a brief example of this nomenclature, it will be understood that a description such as that above of the fiber optic channel set 290 for the readhead portion 60, which includes receiver optical fibers 130a, 130b, and 130c, also indicates that the fiber optic channel sets 290' and 290" for the readhead portions 60' and 60" include receiver optical fibers 130a', 130b', 130c', and receiver optical fibers 130a", 130b", 130c", respectively.

As will be described in more detail below, the readhead portion 60 also includes phase masks 120a, 120b, and 120c arranged over the optical receiver channel apertures provided by the ends of the receiver optical fibers 130a, 130b, and 130c. In various exemplary embodiments, the phase masks of the readhead portions 60, 60', and 60" are conveniently arranged in a co-planar arrangement which defines and/or coincides with a nominal receiving plane 160. At the center of the readhead portion 60, a light source 280 emits a source light 250 generally along a source light axis 251. The source light 250 is generally monochromatic or quasi-monochromatic and has a nominal wavelength $\lambda$. The wavelength $\lambda$ may be any wavelength that is usable to produce operable self-images according to the principles of this invention. The source light 250 generally diverges at a divergence half-angle 252. The source light 250 travels over a distance and illuminates the grating structure of the scale track 80 at an illumination spot 253 and is reflected as scale light 254 generally along a scale light axis 255. In the embodiment shown in FIG. 1, the source light axis 251 and the scale light axis 255 are parallel to the Z axis and mutually coincide. The scale light 254 travels over a distance to a self-image plane 265, which coincides with the nominal receiving plane 160. In a self-image plane 265, the scale light 254 provides an illumination field 256 including a self-image of the scale track 80. The self-image is spatially filtered by the respective phase masks 120 to provide the basic respective position measurement signals of the readhead portion 60. It will be appreciated that the illumination spot 253 and the illumination field 256 may be much smaller than a typical ferrule 40 that may be used as the housing for the readhead arrangement. This feature is what allows multiple readhead portions to be utilized in a single ferrule. For example, a standard telecommunications sized ferrule in one embodiment has a diameter of approximately 2.5 mm. The illumination field 256 can be made much smaller than this dimension, thus allowing the use of multiple readhead portions within the ferrule 40.

In one embodiment, the grating patterns for each of the scale tracks 80, 80', and 80" have spatial wavelengths, also called pitches or grating pitches herein, that are on the same order of size. In general, in an embodiment utilizing such scale tracks, the finest wavelength scale track may be utilized for the middle scale track, which in this embodiment is the scale track 80'. However, it will be understood that a different order may also work even with certain misalignments, in an embodiment where the wavelengths are on the same order of size. The scale tracks 80, 80', and 80" are precisely located, preferably on a single substrate 95, so as to precisely fix the scale tracks of differing wavelengths relative to one another.

As will be discussed in more detail below, in various exemplary embodiments the phase masks 120 of the readhead portions 60, 60', and 60" may be included in a single mask. In other words, the single mask includes the appropriate phase mask elements for the readhead portions 60, 60', and 60". This fixes the positioning of the readhead portions 60, 60', and 60" relative to one another in the precisely known manner such that the output signals can be corrected and compared to each other in signal processing so as to obtain an absolute measurement, with similar calibration constants from one absolute encoder system to another.

The groove 45 and collar 50 of the ferrule 40 are provided to conveniently fix the yaw and Z components of the readhead alignment relative to the scale 90 during mounting of the ferrule 40 in a suitable mounting fixture. It should be appreciated that alternative embodiments of the ferrule are possible. For example, in various exemplary embodiments, the portion of the ferrule that surrounds the circumference of the single mask element is omitted or replaced with a protective ring tube that is added later, such that the receiver optical fibers 130a, 130b, and 130c and the like may be easily polished flush with the end of the ferrule 40 prior to assembling the single mask element to the ferrule 40. In various other embodiments, the ferrule may have a square or rectangular outer profile, and the sides of the ferrule then provide a convenient surface for fixing the yaw component of readhead alignment relative to the scale 90 during mounting, and the Z component of readhead alignment may alternatively be set from a front surface of the readhead rather than the collar 50. One exemplary mounting fixture arrangement is described in the previously incorporated '312 Application. As will be described in more detail below with respect to FIG. 10, a deflector may be fixed on the front end of the ferrule 40. It will be appreciated that with a larger ferrule more readhead portions and corresponding scale tracks can be included so as to increase the absolute distance that can be measured or to enhance the robustness or accuracy of the readhead. Various potential configurations illustrating different numbers of readhead portions and additional scale tracks will be described in more detail below with reference to FIGS. 7 and 9.

With regard to considerations for producing a narrow scale, it should be appreciated that each of the scale tracks 80, 80' and 80" should be dimensioned and positioned to receive a light from primarily, or preferably only, a single corresponding illumination spot 253, 253' or 253", respectively. In various exemplary embodiments, the source fiber 170 is configured or selected to provide a divergence half-angle 252 which provides a size for illumination spot 253 which is approximately in the range of 200 to 350 microns for the half-maximum-intensity diameter of a Gaussian illumination beam, also referred to as the half-maximum diameter herein, when the distance between the scale tracks 80, 80' and 80" and an operable illumination field 265, that is, the nominal operating gap, is on the order of 1.0 mm. In general, the scale track 80 is dimensioned with a track width at least equal to the half-maximum-intensity diameter of the illumination spot and the center-to-center spacing of adjacent scale tracks is made at least somewhat greater than the track width. Thus, in various exemplary embodiments, the width of the scale tracks of the scale 90 may be as small as approximately 0.3 mm for operating gaps on the order of 1.0 mm. In various exemplary embodiments, the width of the scale tracks of the scale 90 may be as small as approximately 0.6 mm for operating gaps on the order of 0.6 mm.

However, it should be appreciated that the center-to-center spacing of adjacent scale tracks generally depends on the center-to-center offset between the various readhead portions 60, 60' and 60" along a direction perpendicular to the measuring axis. In various exemplary embodiments, this offset may be approximately the same as the half-maximumintensity radius at the nominal receiving plane 160, which is approximately the same as the half-maximum-intensity diameter of the illumination spot in various exemplary embodiments. However, in various other exemplary embodiments, the offset is at least two to four times the half-maximum-intensity radius at the nominal receiving plane 160, as outlined further below. In various exemplary embodiments, the scale tracks are made as wide as their readhead-determined center-to-center spacing allows, which simplifies mounting and alignment of an absolute position fiber optic readhead arrangement according to this invention.

With regard to considerations for producing a compact readhead, it should be appreciated that in various exemplary embodiments each of the readhead portions 60, 60' and 60" are dimensioned and positioned to receive a light from primarily, or preferably only, a single corresponding illumination field 256, 256' or 256", respectively. In various exemplary embodiments where the nominal operating gap is on the order of 1.0 mm and the size for illumination spot 253 is approximately in the range of 200 to 350 microns for the half-maximum diameter of a Gaussian illumination beam, the size for the illumination field 256 is approximately in the range of 400 to 700 microns for the half-maximum diameter of a Gaussian illumination field. For such a size for the illumination field 256, in one exemplary embodiment, the receiver optical fibers 130a, 130b, and 130c have a diameter of approximately 250 μm and are positioned with their centers approximately 250 μm from the center of the illumination field 256. More generally, in various other exemplary embodiments, the receiver optical fibers 130a, 130b, and 130c are dimensioned and positioned in accordance with the teachings of the incorporated '312 Application and/or as outlined with reference to FIG. 8, below. In any case, the phase masks 120a, 120b, and 120c are arranged over the optical receiver channel apertures provided by the ends of the receiver optical fibers 130a, 130b, and 130c.

As indicated above, in various exemplary embodiments the center-to-center spacing of adjacent pairs of the illumination fields 256, 256' and 256" is at least somewhat greater than the operable illumination field diameter. Thus, for example, in various exemplary embodiments where the half-maximum diameter of a Gaussian illumination field is 400 to 700 μm, the center-to-center spacing of the illumination fields 256, 256' and 256" is at least approximately 450 to 750 μm. In such embodiments, the diameter of the readhead 20 may easily be as made as small as 2.5 mm or smaller. However, it should be appreciated that care must be taken in this design range, because as the center-to-center spacing between the readhead portions is decreased, the amount of potential self-image light crossing over as "interference" between readhead portions increases. If it is desired to achieve the smallest possible readhead size while at the same time substantially eliminating such crossover interference to maintain the maximum readhead signal accuracy, in various exemplary embodiments, such interference can be eliminated by the time-multiplexing method outlined further below.

In various other embodiments, for enhanced signal separation for the various readhead portions 60, 60' and 60" under a variety of operating conditions, it is desirable to dimension the center-to-center spacing approximately two to four times the nominal half-maximum diameter of the Gaussian illumination distribution in the illumination fields 256, 256' and 256". For example, for the 400 to 700 micron size range indicated above for a Gaussian illumination field 256, in various exemplary embodiments, the center-to-center spacing of adjacent pairs of the illumination fields 256, 256' and 256" may be on the order of approximately 1.4 to 2.8 mm for relatively larger illumination fields and 0.8 to 1.6 mm for relatively smaller illumination fields. In various exemplary embodiments where the nominal operating gap is on the order of 0.6 mm, the size range for a Gaussian illumination field 256 may be approximately 800 to 1400 microns and the center-to-center spacing of adjacent pairs of the illumination fields 256, 256' and 256" may be on the order of approximately 2.6 to 5.6 mm for relatively larger illumination fields and 1.6 to 3.2 mm for relatively smaller illumination fields. Accordingly, in various exemplary embodiments, depending on a number of design factors, as indicated above, the overall diameter of the readhead 20 may easily be as made as small as approximately 7 mm, 5 mm, 3 mm, or even smaller.

With regard to other considerations for producing a more compact readhead, of course it is important to align the X and Y positions of the readhead portions relative to the corresponding scale tracks. The better these are aligned, the smaller the margin on the scale track size may be. The ferrule 40 can be located kinematically in a manner that in one embodiment is repeatable to 10 microns or less. Such ferrules are commonly used in telecommunications for center-to-center submicron alignment.

It should be appreciated that the foregoing discussion of compact readhead and scale size assumes that the light source(s) of each readhead portion operates continuously. However, it should be further appreciated that due to the extremely high speed light modulation potential of the all-optical light sources and receiver channels, it is also possible to design a more compact readhead configuration than that outlined above, wherein the various illumination fields overlap the receivers of multiple readhead portions, but the sources and receivers of each respective readhead portion are operated individually and sequentially in time, such that signal interference between adjacent readhead portions is prevented. It should also be appreciated that, alternatively, in various exemplary embodiments, individual readhead portions may use significantly different wavelengths of light along with a matching narrow bandpass optical wavelength filter positioned to block the other wavelengths of crossover interference light from their corresponding fiber optic receiver channels. In yet other exemplary embodiments, such matching narrow bandpass optical wavelength filters may be positioned outside the readhead in a suitable fiber optic readhead signal processing remote electronics, such as that shown in FIG. 4, to filter the optical output signals from the corresponding individual readhead portions. In yet other exemplary embodiments, it should be appreciated that respective photodetectors having suitably chosen matching optical wavelength response in a suitable fiber optic readhead signal processing remote electronics can effectively augment and/or replace the respective matching narrow bandpass optical wavelength filters in various exemplary embodiments. In either case, the respective narrow bandpass optical wavelength filters and/or the respective photodetectors having suitably chosen matching optical wavelength response act to substantially block any light that has a wavelength different from their respective matching wavelength of light from contributing to respective electronic signals arising from the optical output signals of their corresponding respective readhead portions. It should also be appreciated that even if different wavelengths of light are not used in different readhead portions, these same techniques can be used to block or diminish the signal-degrading effects of ambient light in a readhead according to the principles of this invention.

In such time-multiplexed and/or optically filtered embodiments, it should be appreciated the overall readhead design can be made as compactly as allowed by the physical sizes of the various readhead components.

Accordingly, with suitably chosen fiber sizes, in various exemplary embodiments the overall readhead diameter can easily be made as small as 2.5 mm, 1.8 mm, 1.25 mm, or even smaller.

Figure 2:
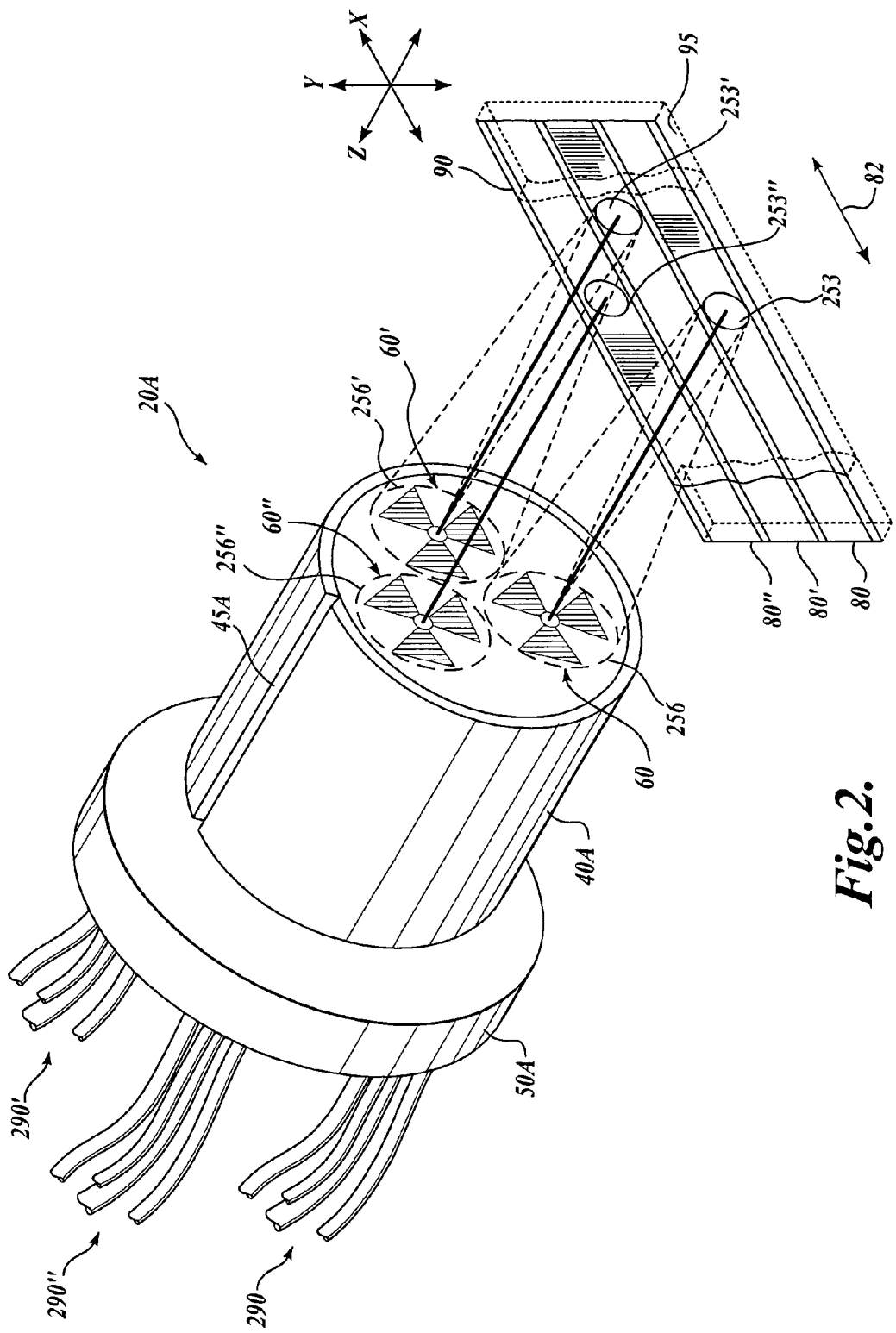
FIG. 2 is an isometric view of a second generic embodiment of an absolute position fiber optic readhead arrangement according to this invention.

FIG. 2 shows a second generic embodiment of an absolute position fiber optic readhead arrangement 20a according to this invention. The readhead arrangement of FIG. 2 is similar to that of FIG. 1, except that the readhead portions 60, 60', and 60" are arranged in a more compact configuration in the embodiment of FIG. 2. More specifically, in the embodiment of FIG. 2, the readhead portions 60, 60', and 60" are arranged in a triangular formation, as opposed to the linear formation of the embodiment of FIG. 1. The embodiment of FIG. 2 thus illustrates a readhead configuration that can be placed within an even smaller ferrule 40a, thus providing a more compact readhead. Otherwise, similarly numbered elements of the readhead arrangements 20 and 20a are similarly constructed and function similarly.

Figure 3:
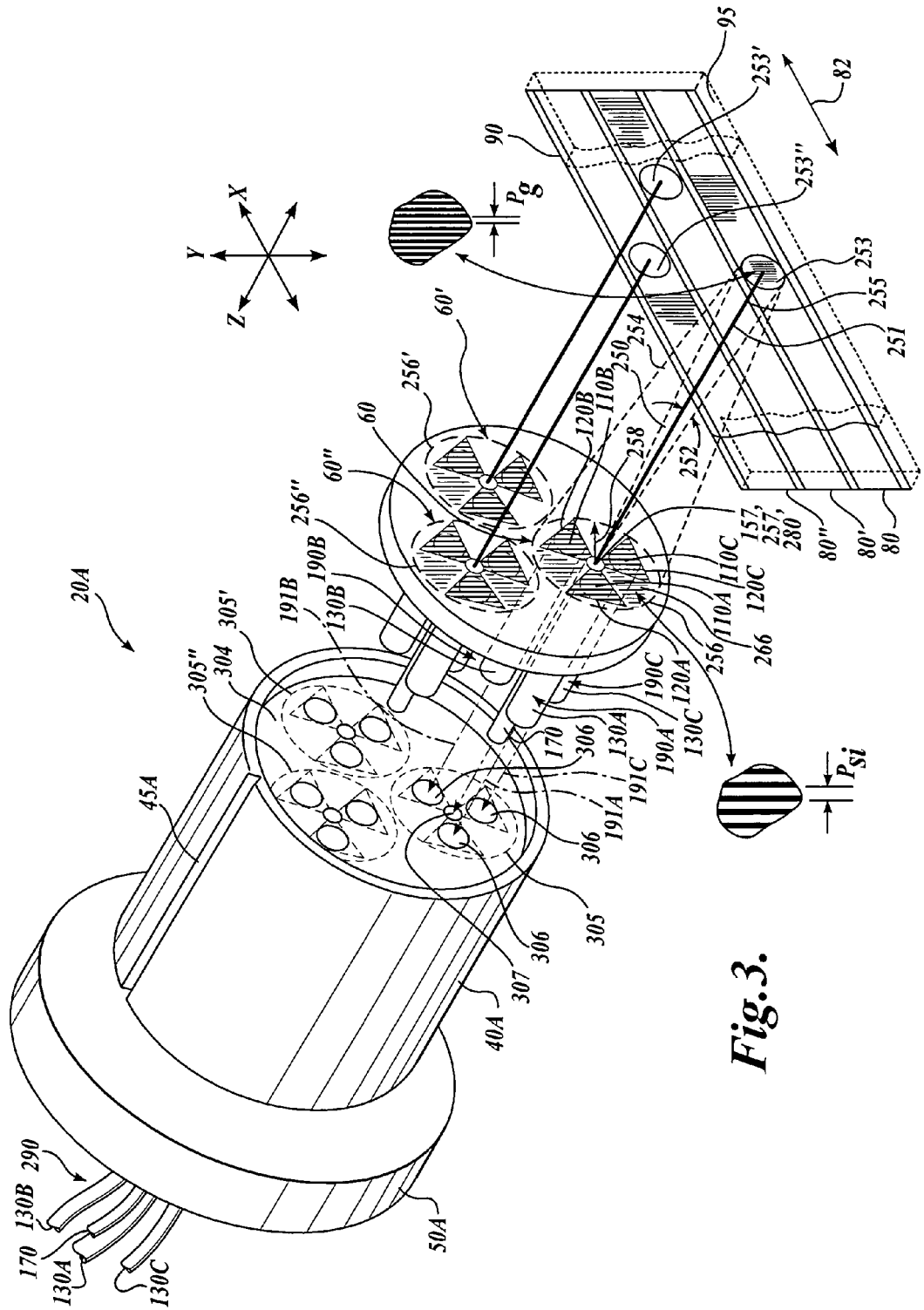
FIG. 3 is a partially exploded isometric view of the second generic embodiment of the absolute position fiber optic readhead arrangement of FIG. 2.

FIG. 3 is a partially exploded view of the readhead arrangement of FIG. 2. As shown in FIG. 3, in the readhead arrangement 20a, the readhead portion 60 corresponds to three fiber optic receiver channels 190a, 190b, and 190c. The fiber optic receiver channel 190a includes a receiver channel aperture 110a, a phase mask 120a, and a receiver optical fiber 130a. The receiver channel aperture 110a is located behind the phase mask 120a. Similarly, the fiber optic receiver channel 190b includes a receiver channel aperture 110b, a phase mask 120b, and a receiver optical fiber 130b. Similarly, the fiber optic receiver channel 190c includes a receiver channel aperture 110c, a phase mask 120c, and a receiver optical fiber 130c.

For each fiber optic receiver channel 190, the phase mask 120 includes a grating that completely covers the receiver channel aperture 110, acting as a spatial filter for incoming illumination. The receiver optical fiber 130 is aligned with the receiver channel aperture 110 such that nominally all illumination received by the receiver channel aperture 110 is channeled down the optical fiber 130 to provide an optical signal 191. In various exemplary embodiments the receiver channel aperture 110 is simply a flat end of the receiver optical fiber 130. In various other exemplary embodiments the receiver channel aperture 110 is a shaped end of the receiver optical fiber 130. In various other exemplary embodiments the receiver channel aperture 110 is a compact refractive or diffractive lens, which gathers the incoming illumination through the phase mask 120, concentrates the light, and directs the light to the end of the receiver optical fiber 130, which is aligned to receive the light efficiently. For reasons described in the incorporated '312 Application, in various exemplary embodiments each receiver channel aperture 110 spans at least one full period or pitch of the associated phase mask 120, making the phase of the optical signal passing into the receiver channel aperture 110 at least somewhat insensitive to the positioning of the light collecting area of the receiver channel aperture 110 relative to the light-blocking elements of the phase mask 120. In various other exemplary embodiments each receiver channel aperture 110 spans at least three full periods of the associated phase mask 120, making the phase of the optical signal passing into the receiver channel aperture 110 even less sensitive to the positioning of the light collecting area of the receiver channel aperture 110. More generally, the more periods of the phase mask 120 that are spanned by the receiver channel aperture 110, the less sensitive the phase of the optical signal passing into the receiver channel aperture 110 will be to its positioning. The receiver channel aperture 110, the phase mask 120 and the end of the receiver optical fiber 130 of each fiber optic receiver channel 190 are fastened in a fixed relationship to each other by adhesives or other suitable methods.

The location of the receiver channel apertures 110 is conveniently described with reference to a channel arrangement center 157 of the fiber optic receiver channel arrangement. In various high accuracy optical fiber readhead embodiments according to this invention, the channel arrangement center 157 is positioned to coincide with the nominal center of any illumination field presented to the fiber optic receiver channel arrangement. The effective center of each respective receiver channel aperture 110a–110c is located at a respective location radius from the channel arrangement center 157. The receiver aperture location radius is generically indicated as $R_{AL}$ herein. For purposes of this invention, in various embodiments where a receiver channel aperture 110 does not have an obvious geometric center, the effective center may be taken as the centroid of the aperture area.

Useful receiver aperture location radii, and aperture areas, may be determined according to the principles of this invention as discussed in detail with reference to FIGS. 5, 6, and 8, below. In various exemplary embodiments, for each readhead portion 60, the receiver channel apertures 110 are identical and their respective location radii are identical. Generally, using identical fiber optic receiver channels 190 in a fiber optic readhead according to this invention allows simpler construction, simpler signal processing and relatively higher measurement accuracy. However, more generally, the receiver channel apertures 110 and/or their respective location radii need not be identical in various exemplary embodiments according to this invention.

The fiber optic receiver channels 190 are generally arranged in a fixed relationship to each other. In particular, for each readhead portion 60, the gratings of the phase masks 120 of each fiber optic receiver channel 190 are nominally coplanar and are fixed in a particular spatial phase relationship with respect to one another in the receiving plane 160 (see FIG. 1). In various exemplary embodiments the phase masks 120 are fixed in a particular spatial phase relationship by fabricating them on a single mask substrate.

It should be appreciated that although FIGS. 1–3 show each of the readhead portions 60, 60' and 60" assembled in a single ferrule 40 using a single mask substrate, in various other exemplary embodiments according to this invention, each of the readhead portions 60, 60' and 60" may fabricated as separate elements, much as disclosed in the incorporated '312 Application. For example, each of the readhead portions 60, 60' and 60" may be assembled in a subferrule using a separate mask substrate, and subsequently assembled into an overall ferrule similar to the ferrule 40 according to the principles of this invention. In such embodiments, it should be appreciated that for each of the readhead portions 60, 60' and 60", the receiver plane 160 is arranged to nominally coincide with the self-image plane 265 as previously described with reference to FIG. 1. However, it is not strictly necessary that these planes are designed and assembled to be the same plane for all the individual readhead portions, provided that each plane is individually designed and assembled to be compatible with an eventual nominal operating gap as outlined further below, and that operating gap is sufficiently well controlled during actual mounting and operation.

In any case, as previously outlined, each of the readhead portions 60 is arranged to provide a self-image of the grating structure of the corresponding scale track 80. The basic principle of self-images, also known as Talbot images, is well known and is not described in detail here. One classic analysis is presented in the paper by Cowley, J. M., and Moodie, A. F., 1957, *Proc. Phys. Soc.* B, 70, 486, which is incorporated herein by reference. As shown in FIG. 3, the self-imaging arrangement includes a light source 280 and the scale track 80, separated by a source gap. The dimension of the source gap is generally designated as either $z_s$ or, if the source gap and an image gap are the same, as z herein. The scale track 80 is aligned along a measuring axis 82 and includes grating elements or bars extending perpendicular to the measuring axis 82, as indicated by vertical lines in an illumination spot 253. The grating elements or bars are arranged periodically along the measuring axis 82 according to a grating period, generally indicated herein as the wavelength, grating period, pitch or grating pitch $P_g$. It will be understood that the scale tracks 80' and 80'' also have corresponding grating periods $P_g'$ and $P_g''$, respectively (not shown).

The X, Y and Z axes shown in FIG. 3 may be defined with reference to the plane of the scale track 80. The X axis is parallel to the plane of the scale track 80 and to the measuring axis 82. The X-Y plane is parallel to the plane of the scale track 80 and the Z axis is perpendicular to that plane.

The illumination field 256 has an illumination field center 257 and a nominal illumination field radius 258. The self-image is an image consisting of light and dark stripes, each extending perpendicular to the measuring axis 82. The light and dark stripes are periodic in the direction parallel to the measuring axis 82 according to a self-image period, generally indicated herein as the self-image period or self-image pitch $P_{si}$.

In the self-imaging arrangement, the self-image plane is parallel to the plane of the scale track 80. It should be appreciated that self-images are localized in space at a particular set of self-image planes. When the light source 280 is effectively a point source, and the arrangement is approximately as shown in FIG. 3, the self-image conditions for the usable self-image planes, including both "in phase" images and "reverse" images are:

$$\frac{z_s z}{z_s + z} = 2v \frac{P_g^2}{\lambda} \quad \text{(Eq. 1)}$$

and for the magnification of the image pitch $P_{si}$ relative to the grating pitch $P_g$:

$$P_{si} = \frac{z_s + z}{z_s} P_g \quad \text{(Eq. 2)}$$

where:
v=0, 1, 2, . . .
$z_s$ is the source gap;
z is the image gap; and
$\lambda$ is the wavelength of the source light.

Thus, for the configuration shown in FIG. 3, with $z=z_s$ usable self-image planes are located at integer multiples of $2P_g^2/\lambda$ and the image pitch $P_{si}$ will be twice the grating pitch $P_g$.

It should be appreciated that there are also images generally known as Fresnel images located at planes between the self-image planes. So long as the pitch of the phase masks 120 are adjusted to match the pitch of a chosen Fresnel image, Fresnel images may be used as self-images according to the principles of this invention and are encompassed within the term self-image as used herein. The characteristics of Fresnel images can be understood and applied with reference to the article by Krzysztof Patorski, The Self-Imaging Phenomenon and Its Applications, *Progress in Optics*, ed. E. Wolf, 27, 3-108, North Holland, Amsterdam 1989.

In various other embodiments according to this invention, the scale track 80 is a reflective phase grating type scale specifically constructed such that the $0^{th}$ order reflection from the scale is suppressed. While the self-images of a phase grating are not usable for an encoder, other usable images are available that give stronger signal than available with an amplitude grating such as that in the analysis above. It should be appreciated that for such embodiments, the location of the usable images deviates from the location of the self-images in the analysis above. The distance between the best usable image planes will remain the same as analyzed above, except there will be a certain additional offset in the gap between the scale and the first usable image plane of half the distance between usable image planes. For instance, a phase grating of 20 micron period with source wavelength 780 nm in a reflective configuration with $z=z_s$ will have usable image planes (with successively opposing phases) at nominal gaps of $z=0.513+v*1.026$ mm, $v=1,2,3$ . . . , neglecting possible offsets from mask and scale substrate thicknesses. The offset required to adjust the gap for best operation may easily be determined experimentally by observing the fiber optic receiver channel signals at various operating gaps. Alternatively, appropriate analysis or simulation may be used to determine the additional offset.

In various exemplary embodiments according to this invention, a particularly simple and effective embodiment of the light source 280 is the end of a single optical fiber that transmits coherent light provided by a remote laser diode or other suitable light source, as exemplified by the illumination fiber 170. In various other exemplary embodiments, the light source 280 is two or more such sources arranged at a precise spacing. In yet other various other exemplary embodiments, the light source 280 is a periodic array of source grating apertures arranged at the end of one or more optical fibers that transmits light from a remote LD or LED or other suitable light source. The source grating apertures have a prescribed width and a prescribed period. In yet other exemplary embodiments, the light source 280 is provided by a miniature solid state laser element, an array of such elements, or a source grating and a miniature LED element contained in the fiber optic readhead. In such cases it should be appreciated that the readhead construction may become more complex and costly, and some of the benefits of an all-optical readhead are lost. However, even in such cases, at least some of the benefits of a readhead incorporating an all-optical receiver channel arrangement according to this invention will remain, and other benefits may be gained.

As shown in FIG. 3, the light source 280 emits the source light 250, generally along a source light axis 251. The source light 250 travels over a distance z equal to a source gap, and illuminates the scale track 80 at an illumination spot 253.

The illumination spot 253 reflects light as scale light 254 generally along the scale light axis 255. In the embodiment shown in FIG. 3, the source light axis 251 and the scale light axis 255 are parallel to the Z axis and mutually coincide. The scale light 254 travels over a distance z equal to the image gap to a self-image plane 265 (see FIG. 1). In the self-image plane 265, the scale light 254 provides an illumination field 256 including the self-image 266 consisting of light and dark stripes at the self-image pitch $P_{si}$, as previously described.

The receiver plane 160, previously described with reference to FIG. 1, is arranged to nominally coincide with the self-image plane 265. It should be appreciated that the self-image actually exists in "less focused" planes adjacent to the previously described "perfect" self-image planes. In some exemplary embodiments, the receiver is intentionally arranged to nominally coincide with such "less focused" self-image planes, and an adequate or desired image is still detected according to the principles of this invention. For example, such "less focused" self-image planes may be intentionally chosen to suppress unwanted higher-order spatial harmonic content in the self-image 266. The channel arrangement center 157 is also nominally aligned with the illumination field center 257. It should be appreciated that in this embodiment of the fiber optic readhead arrangement, the source 280 is also nominally aligned with the illumination field center 257. The alignment of all components is readily achieved in various exemplary embodiments by the use of an alignment hole set 304 with alignment portions 305 generally located proximate to and aligned with the phase masks 120a–120c and having the required number of receiver fiber holes and, source fiber holes, if applicable. The alignment hole set 304 may be provided in a plate inserted into the ferrule 40a, or alternatively by holes provided directly in the ferrule 40a. In either case, the various fiber ends are inserted and fixed in the appropriate holes to provide the required alignments. In various exemplary embodiments, the receiver optical fibers 130a, 130b, and 130c and are polished flush with the end of the element that includes the alignment hole set 304 prior to assembling the element carrying the phase masks 120. In such embodiments, if the alignment hole set 304 is provided directly in the ferrule 40a, the portion of the ferrule that surrounds the element carrying the phase masks 120 may be omitted or replaced with a protective ring tube that is added later. FIG. 3 shows the alignment hole set 304 with the alignment portions 305. The alignment hole set 304 is to be positioned proximate to the phase masks 120, not in the "exploded" position illustrated. The alignment portions 305 have receiver fiber holes 306 and a source fiber hole 307, if applicable in various embodiments.

In the nominally aligned receiver plane 160 and self-image plane 265, for each respective fiber optic receiver channel 190, the respective phase mask 120 spatially filters the incoming self-image illumination. In the exemplary embodiment shown in FIG. 3, the respective phase masks 120a, 120b and 120c each have a mask pitch $P_m$ that is the same as the self-image pitch $P_{si}$, and they are arranged at respective spatial phase positions of 0 degrees, 120 degrees and 240 degrees in terms of the self-image 266. Thus, the fiber optical fiber receiver channels 190a, 190b and 190c receive illumination similarly spatially filtered except for a spatial phase difference. It will be appreciated that as the scale track 80 moves by an increment $P_g$ along the measuring axis, the self-image moves by an increment $P_{si}$ relative to the phase masks 120. Thus, the optical signals 191a, 191b and 191c corresponding to the optical receiver channels 190a, 190b and 190c show approximately identical sinusoidal intensity variations as the scale track 80 moves along the measuring axis, but with relative phase shifts of 120 degrees. Well known methods are available for determining the displacement of the scale track 80 relative to the phase masks 120a, 120b and 120c based on such "three-phase" displacement signals. One exemplary method is described in the previously incorporated '312 Application. In particular, in one exemplary embodiment of the present invention, the three optical signals 191a, 191b and 191c of the readhead portion 60 can be processed by the exemplary method described in the '312 Application to determine two derived quadrature signal values $Q_1$ and $Q_2$. More generally, each of the three optical signals from each of the readhead portions 60, 60' and 60'' can be similarly processed to yield respective derived quadrature signal values $Q_{1i}$ and $Q_{2i}$, where i is a subscript corresponding to the particular scale track that is being analyzed. In the following discussion, for example, i=1 for scale track 80', i=2 for scale track 80, and i=3 for scale track 80''. In each case, the two derived quadrature signal values $Q_{1i}$ and $Q_{2i}$ can be processed to determine a current phase position $\phi_i$ within a wavelength or period of the respective scale track 80, 80', or 80'' using a two-argument arctangent function that is modulo $2\pi$:

$$\phi_i = a\tan 2(Q_{1i}, Q_{2i}) \qquad (Eq. 3)$$

The two-argument "a tan 2" function shown in EQUATION 3 is available and described in a number of publicly available mathematical programs. The function result is the arctangent of $Q_1/Q_2$, in radians. However, the use of two arguments allows the determination of the quadrant of the resulting angle, so that the result is between –pi and +pi rather than –pi/2 and +pi/2.

In one exemplary embodiment, an operable combination of wavelengths usable according to the principles of this invention are as follows: the scale track 80' has a wavelength $\lambda_1$ equal to 8.000 µm, the scale track 80 has a wavelength $\lambda_2$ equal to 8.020 µm and the scale track 80'' has a wavelength $\lambda_3$ equal to 8.40 µm. With a reflective scale configuration, all of these wavelengths provide an operable self-image at a nominal operating gap between approximately 2.00 and 2.03 millimeters for an illumination wavelength of 635 nm. The scale track 80' and the readhead portion 60' can be used to provide a fine wavelength measurement within one wavelength or period by multiplying the wavelength $\lambda_1$ by the current phase position $\phi_1$. With respect to coarser-resolution measurements described further below, either the current phase position $\phi_1$ and/or the fine wavelength measurement may be described as a relatively finer resolution position measurement, or a relatively finer resolution incremental position measurement. Similarly, with respect to coarser-resolution measurements described further below, for either the scale track 80 and wavelength $\lambda_2$ or the scale track 80'' and the wavelength $\lambda_3$, a similar current phase position $\phi_n$ and/or the corresponding fine wavelength measurement may also be described as a relatively finer resolution position measurement, or a relatively finer resolution incremental position measurement.

The wavelengths $\lambda_1$, $\lambda_2$, and $\lambda_3$ are similar to each other. Thus, the spatial phase difference between pairs of these wavelengths goes through a full 360 degree cycle over a spatial length that is much longer than any of the individual wavelengths $\lambda_1$, $\lambda_2$, or $\lambda_3$. Accordingly, position output information from two readhead portions with different wavelengths, such as two of the readhead portions 60, 60' and 60'', can be combined for long-range measurements.

The combined position information provides absolute position information, based on a spatial "phase relation"

computation, over a "medium wavelength" or "coarse wavelength." This "medium" or "coarse" wavelength corresponds to 360° of relative spatial phase shift, and is derived from the spatial wavelengths of two of the scale tracks. This "medium" or "coarse" wavelength is much longer than the range of absolute measurement that could be achieved by any of the readhead portions alone. Because the "medium wavelength" and the "coarse wavelength" are based on a spatial phase relation computation, such wavelengths may be described as "relationship" wavelengths.

As the spatial wavelengths of two transducers become increasingly similar, the phase difference derived from signals from the two transducers goes through a full 360° cycle over an increasingly longer "phase relation" wavelength. This corresponds to a larger absolute measuring range.

The permissible practical relationship between the wavelengths of the readhead portions and scale tracks, and thus the total absolute measuring range of the device, is dependent on the measurement accuracy for each of the three wavelengths/readhead portions. A high measurement accuracy for an individual readhead portion indicates that positions can be accurately determined to a resolution that is a small part of the scale track wavelength.

"Interpolation ratio" describes the degree to which sub-wavelength resolution or accuracy can be obtained. That is, it is the ratio of the wavelength to the chosen increment of position resolution. This term may be applied to the wavelength of an individual scale track and corresponding readhead portion, or to the effective "medium" or "coarse" wavelengths described above and below.

In the readhead arrangement 20a shown in FIG. 3, a conservative "error margin" for the relative phase computations is desirable for many applications. That is, under the worst case conditions, the "medium" or "coarse" relative phase computation must identify the position of the relatively moving transducer elements corresponding to a particular individual wavelength of the "next finer" measurement mode of the absolute measurement system. Otherwise, an error, corresponding to at least one wavelength of the "next finer" measurement mode, will be created in the overall absolute position computation. "Wavelength ratio" means the ratio of the relatively coarser effective wavelength to the "next finer" effective wavelength, for example, Coarse/Medium, or Medium/Fine.

For the readhead arrangement 20a shown in FIG. 3, a conservative error margin is obtained by using a wavelength ratio that is low compared to a reliable interpolation ratio for the individual readhead portions. The wavelength ratios used in the following exemplary embodiment of an absolute position readhead of this invention are only approximately 21/1 for Medium/Fine and 19/1 for Coarse/Medium. These wavelength ratios provide an adequate or conservative safety margin versus the nominal accuracy and/or interpolation ratio on the order of 32/1, 64/1, or as much as 128/1 or more, that is obtainable for the individual readhead portions 60, 60' and 60" in various exemplary embodiments. Relevant design considerations related to reliably achieving a S/N ratio that supports such an interpolation ratio using fiber optic readhead elements are described in the incorporated '312 Application, and below with reference to FIG. 8.

The wavelength ratios can be increased depending on system design tolerances and allowable costs. However, such increases in the wavelength ratio must be carefully considered in light of the increased risk of measurement errors causing incorrect absolute measurement readings.

The phase difference between the wavelengths $\lambda_1$ and $\lambda_3$ provides an effective coarse wavelength $\lambda_C$ of approximately 3.208 mm, which is also the total absolute measuring range of this exemplary embodiment. It should be appreciated that even this relatively short absolute measuring range is useful in many applications in combination with the nanometer-level fine position resolution which is obtainable with various exemplary readhead and scale embodiments according to the principles of this invention.

The phase difference between the $\lambda_1$ wavelength and the $\lambda_2$ wavelength provides an effective medium wavelength $\lambda_M$ of approximately 0.168 mm. Thus, the Coarse/Medium ratio is $\lambda_C/\lambda_M=3.208/0.168$, or approximately 19. The Medium/Fine ratio is $\lambda_M/\lambda_1=0.168/0.008$, or approximately 21, and as a result, the total Coarse/Fine ratio is approximately 400. The following quantitative description summarizes the design calculations corresponding to the fine, medium and coarse operating modes in a fiber optic absolute position transducer according to this invention.

In particular, for three respective scale track wavelengths $\lambda_1$, $\lambda_2$ and $\lambda_3$ and the spatial phase positions $\phi1$, $\phi2$ and $\phi3$, respectively, of each of the associated readhead portions, the wavelength $\lambda_1$ is assumed to be the fine mode wavelength $\lambda_F$. The wavelength $\lambda_2$ is assumed to be the wavelength with the greatest difference compared to $\lambda_F$ and the wavelength $\lambda_3$ is assumed to be the wavelength most similar to $\lambda_F$. The medium mode wavelength $\lambda_M$ is determined as:

$$\lambda_M = \lambda_1 * \frac{\lambda_2}{\lambda_2 - \lambda_1}. \tag{Eq. 4}$$

Thus, for the exemplary embodiment outlined above, the medium mode wavelength $\lambda_M$ is 0.168 mm. The coarse mode wavelength $\lambda_C$ is determined as:

$$\lambda_C = \lambda_1 * \frac{\lambda_3}{\lambda_3 - \lambda_1}. \tag{Eq. 5}$$

Thus, for the exemplary embodiment outlined above, the coarse mode wavelength $\lambda_M$ is 3.208 mm. As previously stated, the foregoing wavelength ratios, and thus the associated absolute measuring ranges, have a conservative error margin. In various exemplary embodiments, using a properly designed fiber-optic readhead according to the principles of this invention, one or each of the wavelength ratios could be increased by a factor of approximately 2 or 3, to increase the absolute measuring range compared to the foregoing discussion.

The phase position for the coarse wavelength $\lambda_C$ is $\phi_1-\phi_3$. The phase position for the medium wavelength $\lambda_M$ is $\phi_2-\phi_3$, or for the medium wavelength $\lambda_M$, $\phi_2-\phi_1$. The phase position for the fine wavelength $\lambda_F$ is $\phi_1$, as defined by EQUATION 3.

In various exemplary embodiments a coarse position $P_C$ of readhead relative to the scale may be determined as:

$$P_C=\lambda_C*(\phi_3-\phi_1)/2\pi \tag{Eq. 6}$$

where:

$\phi_1$ and $\phi_3$ are the spatial phases determined according to EQUATION 3 and $\lambda_C$ is the coarse wavelength. A medium position $P_M$ within the local medium wavelength $\lambda_M$ of the readhead relative to the scale may be determined as:

$$P_M=\lambda_M*(\phi_2-\phi_1)/2\pi \tag{Eq 7}$$

where:

$\phi_1$ and $\phi_2$ are the spatial phases determined according to EQUATION 3 and $\lambda_M$ is the medium wavelength.

A fine mode position $P_F$ within the local fine wavelength $\lambda_1$ of the readhead relative to the scale may be determined as:

$$P_F = \phi_1 * (\lambda_1/2\pi). \quad \text{(Eq. 8)}$$

The fine, medium and coarse mode position measurements may be combined to determine an accurate and total absolute position of the readhead relative to the scale. According to the methods outlined here, it reasonable to assume that the coarse mode position measurement has a coarser resolution and is less accurate than both the fine and medium mode position measurements. Thus, relative to either the fine or medium mode position measurements, the coarse mode position measurement may be described as a relatively coarser resolution position measurement. It should be appreciated that coarse mode position measurement is absolute within a given coarse wavelength according to the principles outlined here. Similarly, it reasonable to assume that the medium mode position measurement has a coarser resolution and is less accurate than a fine mode position measurement. Thus, relative to a fine mode position measurement, the medium mode position measurement may also be described as a relatively coarser resolution position measurement. It should be appreciated that a medium mode position measurement is absolute within a given medium wavelength according to the principles outlined here.

The coarse position value $P_C$ is the first estimate of the absolute position. The coarse position value $P_C$ is then analyzed to determine to which one of the multiple medium wavelengths (the "nth" medium wavelength) the coarse value $P_C$ corresponds. In general, $(P_C/\lambda_M)$ will equal (n $\lambda_M$)+$R_M$, where $R_M$ is the medium remainder.

The medium position value $P_M$ is the position within the local medium wavelength. In principle, the medium position value $P_M$ should equal $R_M$. However, the medium mode computation is related to a shorter wavelength. Thus, it is assumed to be more accurate than the coarse wavelength computation. Therefore, an improved estimate of the absolute position is determined as $P_M+(n*\lambda_M)$. It should be appreciated that according to this procedure, the determination of the coarse position value $P_C$ only needs to be accurate to better than approximately +/− one-half of the medium wavelength in order to avoid errors in the absolute position measurement.

The value $P_M+(n*\lambda_M)$ is then analyzed to determine which of the multiple fine wavelengths (the "Nth" fine wavelength) the value "$P_M+(n*\lambda_M)$" corresponds to. In general, $P_M+(n*\lambda_M)$ will equal $(N*\lambda_F)+R_F$, where $R_F$ is the fine remainder. The fine position value $P_F$ is the position within the local fine wavelength. In principle, this fine position value $P_F$ should be equal to $R_F$. However, the fine mode measurement and computation is derived from a single readhead portion and scale track, as opposed to a relation between readhead portions and scale tracks, and is based on a shorter wavelength. Thus, it is assumed to be more accurate than the medium wavelength measurement and computation. Therefore, an improved final estimate of the absolute position is determined as $(N*\lambda_F)+P_F$ to determine the scale tracks relative to the read head. This corresponds to the absolute position of the absolute position readheads 20 or 20a relative to the scale 90, for example. It should be appreciated that according to this procedure, the determination of the coarse position value PC only needs to be accurate to better than approximately +/− one-half of the medium wavelength in order to avoid errors in the absolute position measurement.

In various other exemplary embodiments, to increase the absolute range, the accuracy of the interpolation circuits and the accuracy of the fabrication of the scale tracks 80, 80' and 80" can be increased. This allows higher ratios (coarse/medium, medium/fine), and higher levels of interpolation to be used. However, arbitrarily increasing the accuracy of the scale tracks and circuits is generally subject to severe economic constraints. Alternatively, in various other exemplary embodiments, an operable combination of longer wavelengths is determined, to extend the absolute range accordingly. In comparison to the previous exemplary combination of wavelengths described above, this may increase the absolute range by a factor in the range of approximately two to three.

Thus, the exemplary absolute position fiber optic readhead arrangement 20a shown in FIG. 3 provides a displacement measuring system usable in a variety of fiber optic readheads according to this invention. It will also be appreciated by one of ordinary skill in the art that the reflective fiber optic readhead arrangement shown in FIG. 3 has a transmissive fiber optic readhead arrangement counterpart. In such a case, the light source 280 is located along the Z axis at the same distance on the opposite side of a transmissive scale, at a similar source gap between the light source 280 and the scale tracks of the scale.

The exemplary absolute position fiber optic readhead arrangement 20a provides a three-phase measurement system. However, it will be appreciated that alternative embodiments of the phase masks 120, along with corresponding alternative arrangements of the optical receiver channels 190 are usable in the generic fiber optic readhead arrangement, as described in the incorporated '312 Application.

Figure 4:
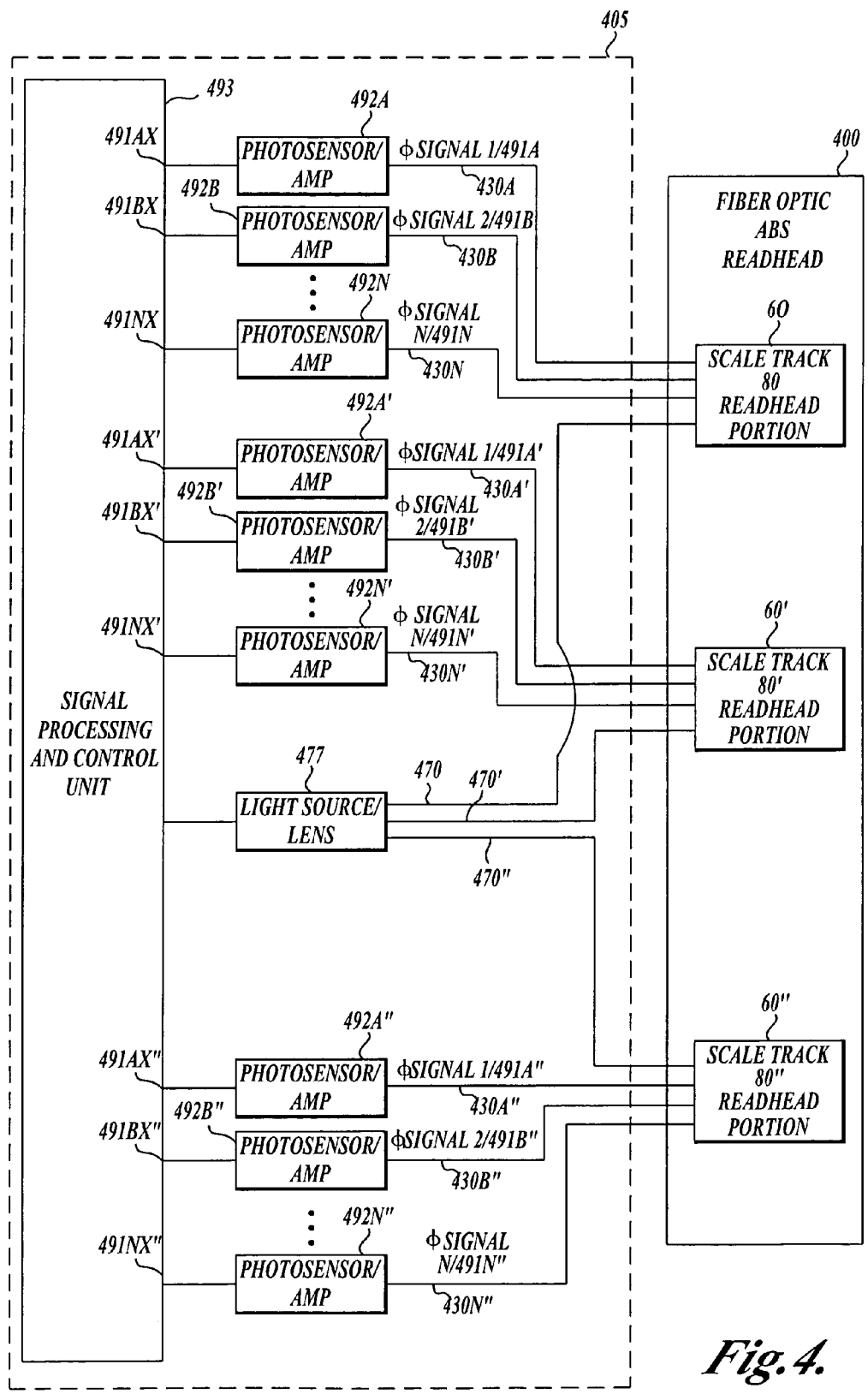
FIG. 4 shows a block diagram including a remote electronic interface unit usable in conjunction with an absolute position fiber optic readhead arrangement according to this invention.

FIG. 4 shows a block diagram including a generic remote electronic interface unit 405 that is usable in conjunction with a fiber optic readhead according to this invention, generically represented by an absolute position fiber optic readhead 400. The remote electronic interface unit 405 includes a signal processing and control unit 493, a light source 477 that may include an optional lens, and an embodiment-specific plurality of photosensor/amps 492A to 492n, 492A' to 492n' and 492A" to 492n". The light source/lens 477 may include other optics such as optical isolators or the like. The light source/lens 477 and the photosensor/amps 492A to 492n are coupled to the readhead portion 60 of the fiber optic readhead 400 through light source optical fiber 470 and receiver optical fibers 430A to 430n, respectively. Similarly, the light source/lens 477 and the photosensor/amps 492A' to 492n' are coupled to the readhead portion 60' of the fiber optic readhead 400 through the light source optical fiber 470' and the receiver optical fibers 430A' to 430n', respectively, and the light source/lens 477 and the photosensor/amps 492A" to 492n" are coupled to the readhead portion 60" of the fiber optic readhead 400 through the light source optical fiber 470" and the receiver optical fibers 430A" to 430n", respectively. While the light source/lens 477 is illustrated as a single unit, in various embodiments a plurality of separate light sources/lens are provided. In particular, in various embodiments disclosed herein where different readhead portions use different respective illumination wavelengths, a separate light sources/lens is provided for each different wavelength. In various other exemplary embodiments, the light source/lens 477 may include one or more individual light source components or a light source array, one per light source fiber, or a single light source that is distributed into multiple fibers either directly or after being initially input into a single fiber that feeds into "split" fibers. In various exemplary embodiments, at least the light source optical fibers 470 which provide light to the "self-image" readhead portions are single mode optical fibers, which provides improved illumination distribution stability despite potential bending and movement of the readhead cable.

The optical fibers may be routed within a readhead cable (not shown) that gathers and protects the optical fibers between the fiber optic readhead 400 and the remote electronic interface unit 405. A single readhead cable or multiple readhead cables may be used. In various exemplary embodiments according to this invention, the readhead cable may be several meters long or more. The receiver optical fibers 430A to 430n carry the optical signals 491A to 491n, respectively. The optical signals 491A to 491n are phase signals provided as described above and further below. Similarly, the receiver optical fibers 430A' to 430n', carry the optical signals 491A' to 491n', respectively, and the receiver optical fibers 430A" to 430n" carry the optical signals 491A" to 491n", respectively.

The light source/lens 477 receives power and may receive gain control signals from the signal processing and control unit 493. As described above, the light source/lens 477 transmits light through the source optical fibers 470, 470' and 470" to the fiber optic readhead 400 and onto the scale grating tracks of the scale 90. The fiber optic detector channels of the fiber optic readhead 400, such as the fiber optic receiver channels 190a to 190c described above, or the like, receive light from the scale grating tracks of the scale 90 and provide the signals 491A to 491n, which are input to the photosensor/amps 492A to 492n, respectively. The photosensor/amps 492A to 492n provide amplified electronic output signals 491Ax to 491nx to the signal processing and control unit 493. Similarly, the photosensor/amps 492A' to 492n' provide amplified electronic output signals 491Ax' to 491nx' to the signal processing and control unit 493, and the photosensor/amps 492A" to 491n" provide amplified electronic output signals 491Ax" to 491nx" to the signal processing and control unit 493. In various exemplary embodiments, the signal processing and control unit 493 then determines an absolute position according to the equations and teachings outlined above.

It will be appreciated that in various exemplary embodiments described further below, an optical fiber readhead according to this invention may provide a plurality of optical fiber receiver channels carrying optical signals that are summed. For such embodiments, fibers carrying the optical signals that are summed can interface to the same photosensor/amp 492 in order to provide the desired signal summing, or to different photosensor/amps 492 which have their the signals summed electronically during additional signal processing. It will be appreciated that in various other exemplary embodiments described further below, an optical fiber readhead according to this invention may provide an additional plurality of optical fiber receiver channels carrying binary optical signals derived from one or more binary code tracks. For such embodiments, the additions fibers carrying the binary optical signals can interface to additional similar connections to a similar light source/lens 477 and similar photosensors/amps 492 in order to provide the desired binary signals for signal processing. Thus the configuration shown in FIG. 4 is intended to be illustrative only and not limiting.

Figure 5:
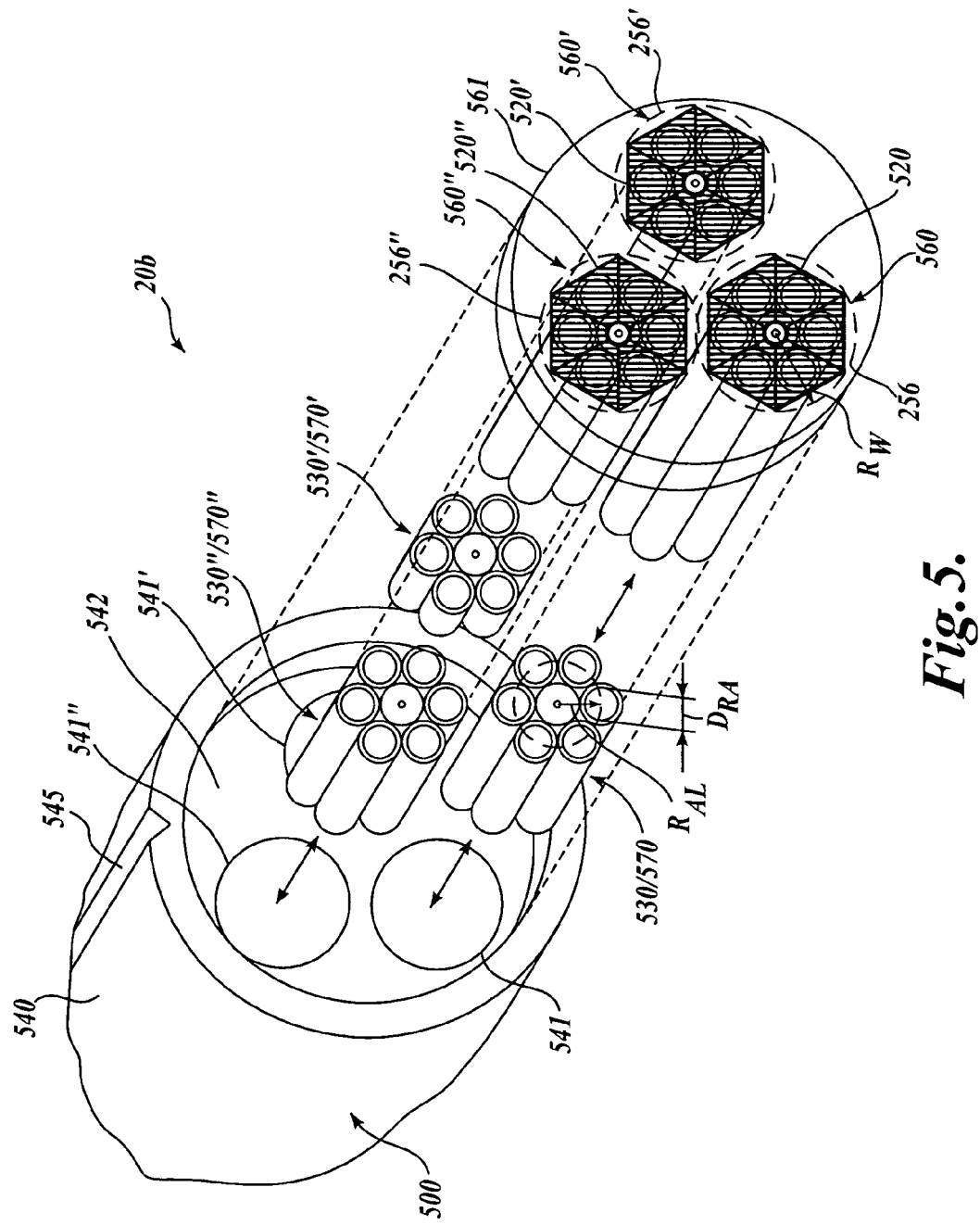
FIG. 5 is a partially exploded isometric view of a third generic embodiment of an absolute position fiber optic readhead arrangement according to this invention.
Figure 6:
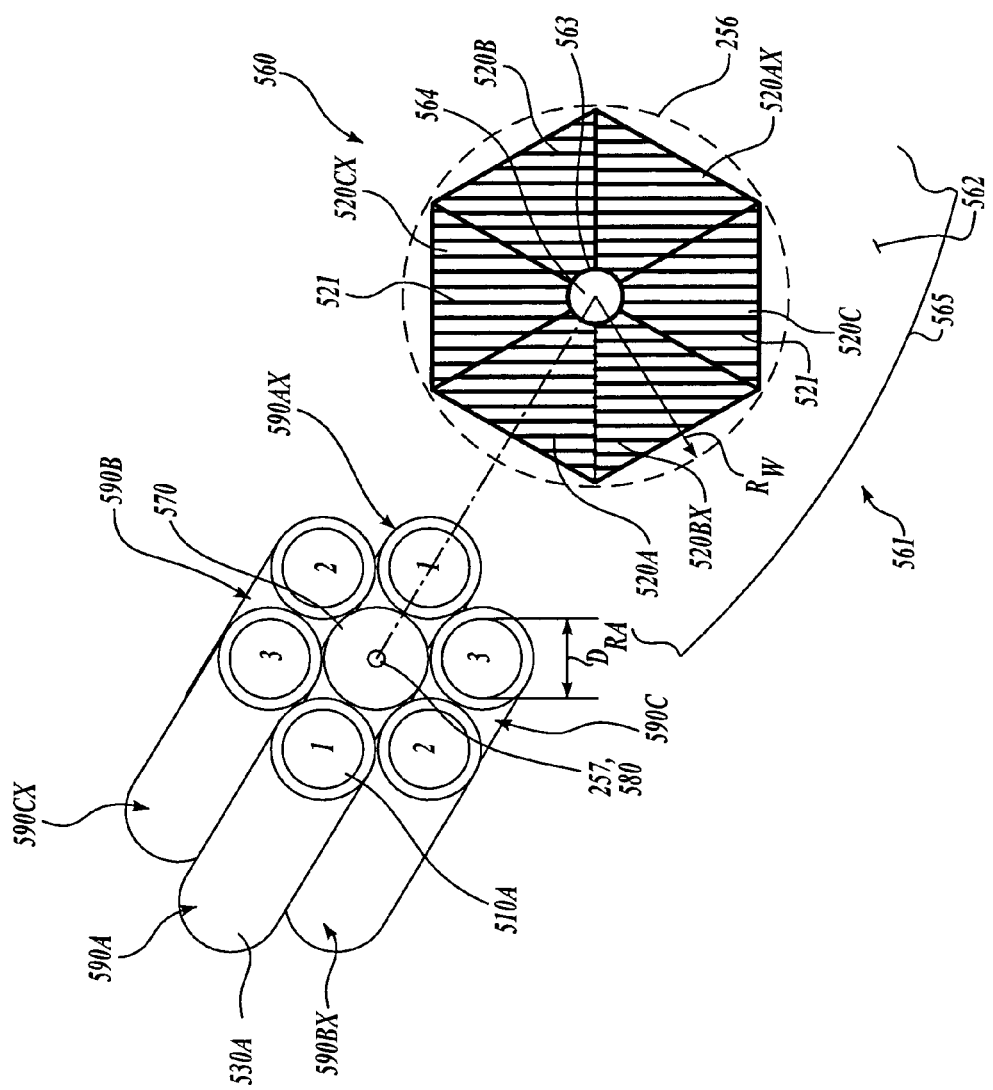
FIG. 6 is a partially exploded isometric view of the fiber and mask arrangement of one of the readhead portions of the absolute position fiber optic readhead arrangement of FIG. 5.

FIGS. 5 and 6 show a third exemplary embodiment of a fiber optic readhead arrangement 20b according to this invention. The fiber optic readhead arrangement 20b operates substantially similarly to the generic fiber optic readhead arrangement 20a described above with reference to FIG. 3, and includes similar components. Due to these similarities in configuration and operation, only certain aspects of the fiber optic readhead arrangement 20b that require additional explanation are described below.

As shown in FIGS. 5 and 6, the fiber optic readhead arrangement 20b includes readhead portions 560, 560' and 560". As best shown in FIG. 6, the readhead portion 560 includes a first set of three fiber optic receiver channels 590A–590C, which operate similarly to the previously described fiber optic receiver channels 190. It should be appreciated that the fiber optic readhead arrangement 20b provides a first example of a "balanced pair" fiber optic readhead according to this invention. To provide a balanced pair fiber optic readhead according to this invention, the fiber optic readhead arrangement 20b includes a second set of three respective balanced fiber optic receiver channels 590Ax–590Cx that are respectively arranged in "balanced pairs" on opposite sides of the illumination field center 257 from the respective fiber optic receiver channels 590A–590C as shown. The pairs of numbers 1-1, 2-2, and 3-3 shown on the optical fiber receiver apertures 510 are indicative of the balanced pairs.

As shown in FIG. 5, a readhead housing 500 includes a cylindrical ferrule 540 with an alignment groove 545. The inner diameter of the ferrule includes three holes 541 which fit with a slight interference fit over the close-packed peripheral optical receiver fibers 530 and central optical source fiber 570 of each of the three respective readhead portions 560. In one exemplary assembly method, the fibers with prepared flat ends are aligned and inserted in the ferrule 540 from the back end and inserted until they protrude slightly beyond a mounting surface 542. Then, the respective phase mask sets 520, 520' and 520" carried on the phase mask element 561 are aligned to the fiber ends under a microscope, pushed against the fiber ends to make them coplanar with the mounting surface 542 and bonded tight to the mounting surface 542. The fibers are then bonded to the ferrule and each other. Alternatively, the mounting surface 542 is made flush with the end of the ferrule 540 and the fibers with prepared flat ends are aligned and inserted in the ferrule 540 from the back end and inserted until they protrude slightly beyond the mounting surface 542. Then, adhesive is placed around the end of the fibers to provide support and to fix the fibers to the ferrule 540. Then the fibers and adhesive are fine ground and/or polished back to flush or nearly flush with the mounting surface 542. Then, the respective phase mask sets 520, 520' and 520" carried on the phase mask element 561 are aligned to the fiber ends under a microscope, pushed against the fiber ends and bonded tight to the mounting surface 542.

In one exemplary embodiment, the phase masks sets 520 are fabricated on the "inside" of the phase mask element 561, nearest the fiber ends. A light source 580 is provided by the end of a source fiber 570. In one exemplary embodiment, the source fiber 570 is a single mode fiber used as a point source for emitting light at a source wavelength of 635 nm, and is the optical fiber part number FS-SN-3224 made by 3M Corporation, that has an outer diameter of $D_{SF}=250$ microns. The receiver optical fibers 530 are all the same commercially available multimode fiber that is a silica fiber with 200/220/250 micron core/cladding/buffer diameters $D_{RA}/D_{RC}/D_{RF}$. Thus, all of the source and receiver fibers in the fiber optic readhead arrangement 20b have the same 250 micron outer diameter and can therefore be arranged in an advantageous close packing assembly arrangement according to this invention that allows both highly accurate and economical precision alignment and assembly. In this exemplary embodiment, the advantageous close packing assembly arrangement is a hexagonal close packing assembly arrangement.

Each of the receiver optical fibers 530 and the source fiber 570 have a cladding and a core. The cladding is represented by the outer circles, and the core is represented by the inner circles. It can be seen that in the embodiment shown in FIG. 6, the source fiber 570 has a relatively small core, with reference to the outer diameter of its cladding. In contrast, the receiver optical fibers, as represented by fiber 530A, have a relatively large core relative to the outer diameter of their cladding.

It will be appreciated that in comparison to the 3-fiber receiver arrangement used in the fiber optic readhead arrangement 20a shown in FIG. 3, the balanced 6-fiber receiver arrangement of this embodiment 20b provides twice as much received light, and therefore twice the potential signal strength. Furthermore, the balanced pair arrangement of the receiver apertures 510 rejects certain errors due to readhead misalignment to further increase measurement accuracy, as described in the incorporated '312 Application.

It should be appreciated that an assembly such as the fiber optic readhead arrangement 20b provides a high resolution all optical encoder readhead where each of the readhead portions 560 has a diameter of 1.0 mm or less. It should be appreciated further that the arrangement provides low-cost precision "self-assembly". It should also be appreciated that the source fiber 570 is intentionally "oversized" solely for these assembly purposes. The fiber optic readhead arrangement 20b also provides a high level S/N ratio according to the design principles that will be discussed below with respect to FIG. 8.

For example, in one specific exemplary embodiment, for a flat end of the exemplary optical fiber part number FS-SN-3224 made by 3M Corporation as described above, it has been determined that the divergence half-angle for the "half-maximum" beam radius is approximately 4.5 degrees. Thus, in one exemplary embodiment of the fiber optic readhead arrangement 20b, for scale grating tracks 80 with a reflective scale and a self-imaging gap of approximately 1.6 mm, the radius $R_W$ of the illumination field 256 is approximately equal to tan(4.5)*2* 1.6 mm=253 microns. For the exemplary optical fiber characteristics and dimensions described above and a close-packing embodiment of the fiber optic readhead arrangement 20b, the location radius $R_{AL}$ of the receiver apertures 510 is approximately equal to 250 microns. Thus, $R_W$ approximately equals $R_{AL}$ and is not far from the value of $0.83*R_{AL}$ as will be discussed in more detail below with reference to FIG. 8. Furthermore, the receiver aperture diameter $D_{RA}$ of the receiver apertures 510 is $D_{RA}$=200 microns, which is approximately 4/5 *$R_{AL}$. According to the information that will be outlined with reference to FIG. 8, with such design relationships, each optical fiber receiver channel should provide a relative S/N ratio that approaches the maximum obtainable value. Experimentally, the inventor has demonstrated stable position readings with a comparable readhead arrangement of this type at a resolution of 1 nanometer using a scale having an 8 micron grating pitch. It should be appreciated that this exemplary embodiment is illustrative only, and not limiting. More generally, source fibers may be prepared or selected to provide a divergence half-angle for the "half-maximum" beam radius from a range of approximately 2 to 10 degrees or more, and the design of corresponding readheads may be chosen according to the principles of this invention and as disclosed in the incorporated '312 Application.

It should be appreciated that the dimensions described for the foregoing exemplary embodiment can provide a fiber optic readhead arrangement where substantially all of the illumination energy in each illumination field 256 is located within a circle having a radius (of approximately 2.55*$R_W$) that is significantly less than the dimension of at least one operable self-imaging gap. It should also be appreciated that the dimensions described for the foregoing exemplary embodiment can provide a fiber optic readhead arrangement where each receiver fiber aperture 510 is spaced apart from the center of a corresponding illumination field 256 (the center coinciding with a scale light axis 256) by a location radius $R_{AL}$ that is significantly less than the dimension of at least one operable self-imaging gap. Such design relations emphasize the compact size achievable for a high-resolution self-imaging readhead portion according to the present invention, which enables the width and height or diameter for a high resolution absolute fiber optic readhead arrangement according to this invention to approach a few times the operating gap dimension or even less. Such compact dimensions allow a readhead arrangement according to this invention to operate and travel in an operating volume that is a fraction of the operating and traveling volume required for previously known readheads having comparable performance features and robustness. Such previously known readheads typically have width and height dimensions that are many times their operating gap dimension, which limits their potential utility, economy, and convenience in many applications.

As shown in FIG. 6, for each readhead portion 560 the phase mask element 561 includes a phase masks set 520 which includes the phase masks 520A–520C and 520Ax–520Cx. Each of the phase masks 520A–520C and 520Ax–520Cx includes grating bars 521 that are opaque to a readhead source light. The grating bars 521 are arrayed on the surface 562 of a substrate 565 that is transparent to the readhead source light. Chrome, copper, and oxides thereof are common materials that may be used for patterning the grating bars 521. Glass and quartz are common substrate materials that may be used for the substrate 565. The active mask area of each of the phase masks 520A–520C and 520Ax–520Cx is the area containing the grating bars 521. This active mask area should be of sufficient size to cover the clear aperture area of the corresponding receiver apertures 510 with extra tolerance for variations in assembly positioning. Shown at the center of the mask element 561 is an alignment ring 563 having a clear aperture 564 for the source light from the optical fiber 570, discussed above. The size of the clear aperture is, for example, several times greater than the single-mode core diameter, which is on the order of $D_{SA}$=4 microns. In one exemplary embodiment the phase mask element 561 is made of soda lime glass, has a thickness of 0.25 mm and a diameter that is matched to the corresponding inner diameter of the ferrule 540 (see FIG. 5).

The mask grating bars 521 are arranged periodically along the X-axis direction according to a period that matches that of the grating image in the operable self-image plane, as previously described. The exemplary phase mask element 561 as shown has six phase masks in each phase mask set 520 for use with six fiber optic receiver channels in a balanced configuration where diametrically opposing fiber optic receiver apertures receive the same phase of light signal modulation with x direction movement of the readhead relative to the scale. The phase masks have spatial phases of 0 degrees (520A and 520Ax), 120 degrees (520B and 520Bx), and 240 degrees (520C and 520Cx). The boundary between the various phase masks 520 is easily visible under a microscope for a phase mask element constructed with grating bars 521 usable in a self-image encoder. These can be used to align the phase mask element 561 relative to the receiver fibers. The inventor has found that alignments within tolerances less than 20 microns and even less than 10 microns are easily achievable using a microscope and an XYZ micrometer stage to position the phase mask element 561 relative to the receiver fibers.

Figure 7:
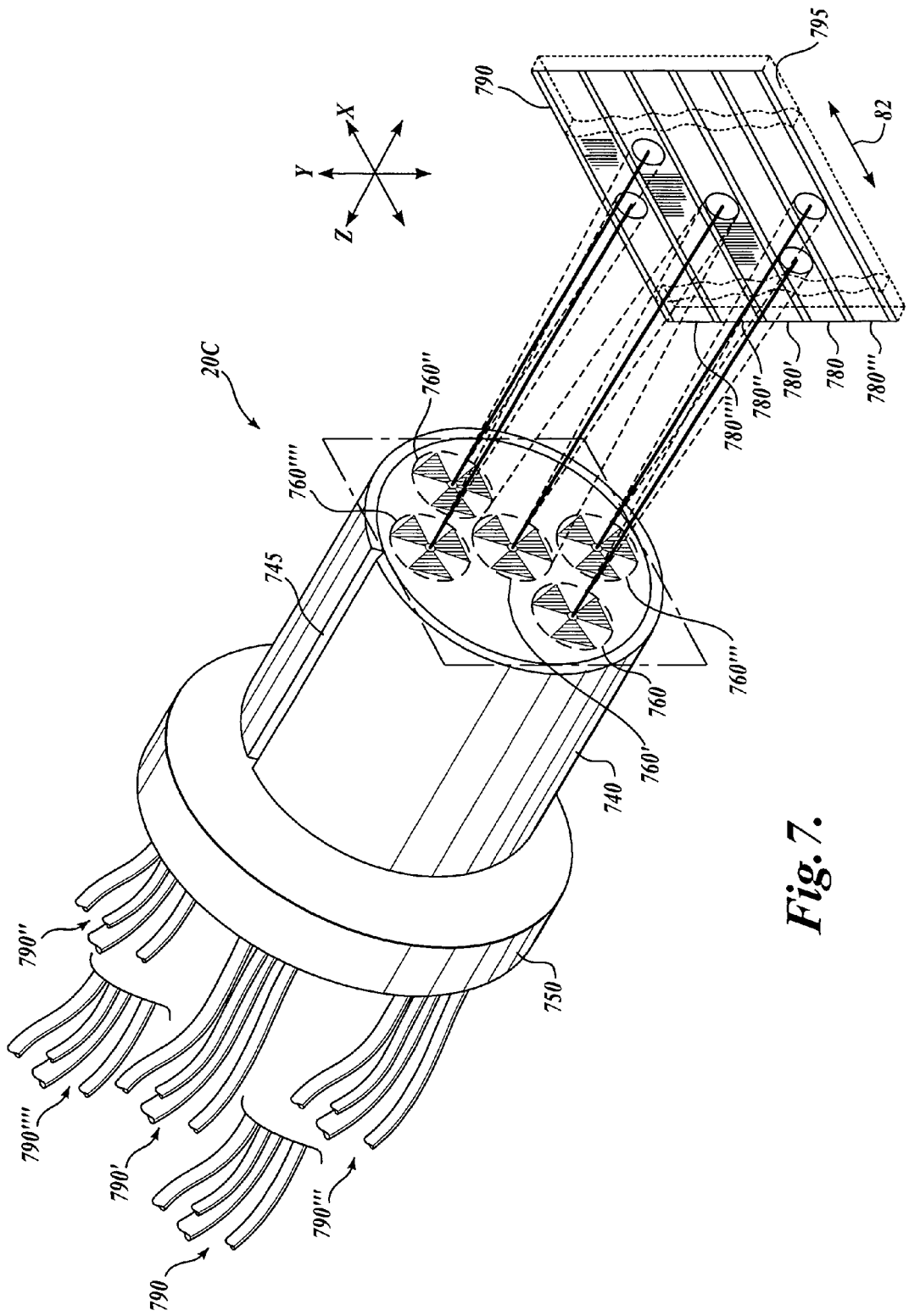
FIG. 7 is an isometric view of a fourth generic embodiment of an absolute position fiber optic readhead arrangement according to this invention.

FIG. 7 shows a fourth generic embodiment of an absolute position fiber optic readhead arrangement 20c. The readhead arrangement 20c includes five readhead portions 760, 760', 760", 760''', and 760'''' corresponding to five scale grating tracks 780, 780', 780", 780''', and 780'''', respectively. Each of the readhead portions 760 operate substantially similarly and includes components similar to those of the readhead portions 60 and scale grating tracks 80 of FIGS. 1–3. Due to the similarities in the components and operation, only certain aspects of the fiber optic readhead arrangements 20c that require additional explanation are described below.

As shown in FIG. 7, the first three readhead portions 760, 760' and 760" have a similar configuration to the readhead portions 60, 60', and 60" of FIG. 1, in that they are arranged in a linear configuration. Due to the circular nature of the ferrule 740, additional room is available for the placement of the additional readhead portions 760''' and 760''''. The ferrule 740 also includes an alignment groove 745 and a collar 750. Each of the readhead portions 760 has corresponding scale grating tracks 780 and receiver channels 790.

In one embodiment, the scale grating tracks 780 may be formed with different wavelengths, with the coarser resolutions being arranged further from the middle. For example, in an embodiment where five wavelengths of scale grating tracks were to be utilized, they could be arranged such that the scale track 780' has a wavelength $\lambda_1$ equal to 8.000 µm, the scale track 780 has a wavelength $\lambda_2$ equal to 8.020 µm and the scale track 780" has a wavelength $\lambda_3$ equal to 8.40 µm similar to an embodiment outlined above. The scale track 780''' could be arranged to have a wavelength $\lambda_4$ equal to 12.600 µm, and the scale track 780'''' could be arranged to have a wavelength $\lambda_5$ equal to 12.620 µm, in order to more than double the coarse wavelength compared to that provided by the wavelengths $\lambda_1$ and $\lambda_3$, as previously outlined. Of course, it should be appreciated that when significantly different scale track grating pitches are used, the wavelengths must be chosen interdependently and the readhead 20c must be arranged approximately at a self-imaging gap that is operable to provide sufficient self-image visibility for both of the scale track grating pitches, all according to the design factors and considerations outlined above in the discussion related to EQUATION 1. As one useful guideline, the operable depth of field of a self-image plane may be assumed to be on approximately be on the order of ⅙ of the distance between associated self-image planes. Alternatively, the operable depth of field, and/or a plane that is operable to provide sufficient self-image visibility for all of the scale track grating pitches, may be determined experimentally. It should be appreciated that in various exemplary embodiments, individual readhead portions may also use significantly different wavelengths of light in order to provide an additional degree of design freedom for achieving substantially similar or identical self-image planes for significantly different scale track grating pitches.

For enhanced robustness with respect to misalignments instead of extended absolute range, including yaw misalignment in particular, the scale grating tracks 780 and the corresponding readhead portions 760 can be arranged in balanced pairs. For example, in an embodiment where only three wavelengths are to be utilized, they could be arranged such that the scale track 780' has a wavelength $\lambda_1$ equal to 8.000 µm, the scale tracks 780 and 780" have a wavelength $\lambda_2$ equal to 8.020 µm and the scale tracks 780''' and 780'''' has a wavelength $\lambda_3$ equal to 8.40 µm similar to an embodiment outlined above. It should be appreciated that when the readhead 20c has a yaw misalignment relative to the scale 790, the symmetric arrangement of the readhead portions 760 and 760" provides signals that differ according to approximately equal and opposite spatial phase shifts due the yaw misalignment. Thus, if the appropriate signals from each of the readhead portions 760 and 760" are summed, the equal and opposite spatial phase shifts ideally compensate each other, negating the effects of yaw misalignment on the absolute position determination. The symmetric arrangement of the readhead portions 760''' and 760'''' provides a similar benefit. Thus, such a balanced pair configuration can be utilized to help nullify yaw misalignments that may occur when mounting the readhead 20c relative to the scale 790.

The following discussion is relevant to the results described with reference to FIG. 8, further below. It should be appreciated that optical fiber readheads according to the present invention can be ultraminiature readheads. It should be appreciated that in contrast with the relatively crude optical fiber encoder readheads that do not use self-imaging and/or that are not designed to provide high resolution, high accuracy position measurement signals and high interpolation ratios, it is desirable to minimize the size and maximize the inherent signal to noise ratio of such optical fiber encoder readheads in many exemplary embodiments. Design constraints such as a desired or economical fiber size, practical illumination field sizes obtained directly from optical fiber sources at specific self-imaging gaps, and practical assembly positioning constraints are all important design considerations. In particular, it should be appreciated that the small receiving aperture diameter that is provided by many optical fibers usable according to this invention may be much smaller than most or all electronic detectors used in prior art readheads, and that such a small receiving aperture diameter severely constrains the available signal energy and the resulting signal to noise ratio.

For all of these reasons, it is important to consider certain design relationships related to providing an adequate signal to noise ratio in light of these severe design constraints. Such design relationships not only indicate the design conditions related to optimum performance, but also indicate a range where design tradeoffs may be made for the sake of assembly techniques, component cost, or other reasons, while still retaining design features that allow micron-level or even submicron-level resolution and accuracy. As discussed in more detail below, certain design factors for optical fiber encoder readheads can be used as guides to provide a readhead design that offers a desirable signal to noise ratio in various exemplary optical fiber encoder readhead embodiments according to this invention.

In various exemplary embodiments, a light source usable according to this invention is a fiber optic light source without a separate lens or collimator. In various exemplary embodiments, such a fiber optic light source outputs a diverging source light beam from its end, the diverging light beam typically having a divergence half angle in the range of 4.5 to 10 degrees. It is reasonable to assume a Gaussian intensity distribution in such a source light beam. The properties of Gaussian beam distributions are well described in texts on the applications of optical fibers. This Gaussian intensity profile is an important consideration in a fiber optic readhead arrangement according to this invention, for a number of reasons. It should be appreciated that the illuminance in such a beam, that is, the useful flux per unit of cross sectional area, is concentrated disproportionately along the beam axis. Thus, a receiver aperture positioned away from the beam axis suffers "extra" signal loss (compared to a "uniform beam assumption") due to the Gaussian distribution. In addition, it should be appreciated that, just as in a uniform beam, the average beam illuminance will decrease due to purely geometric factors whenever the radius of a spot size or illumination field of the beam is increased, due to "divergence loss". Also, it should be appreciated that in an "aligned" reflective configuration, such as those shown in FIG. 3, with a Gaussian beam the highest illuminance in the illumination field 265 is on and surrounding the illumination field center 257. However, mechanical interference with the light source 280 and various other assembly considerations may prohibit locating the receiver apertures 110 in that region of highest illuminance.

The following equation, EQUATION 9, indicates exemplary design considerations for a readhead according to the principles of this invention and takes the factors discussed above into account in the variable D. In addition, the equation includes other important factors to provide a useful analysis of the dependence of the signal to noise ratio on various design factors in a fiber optic readhead arrangement according to this invention:

$$S \approx PCg_1g_2DR_dG_d \quad \text{(Eq. 9)}$$

Figure 8:
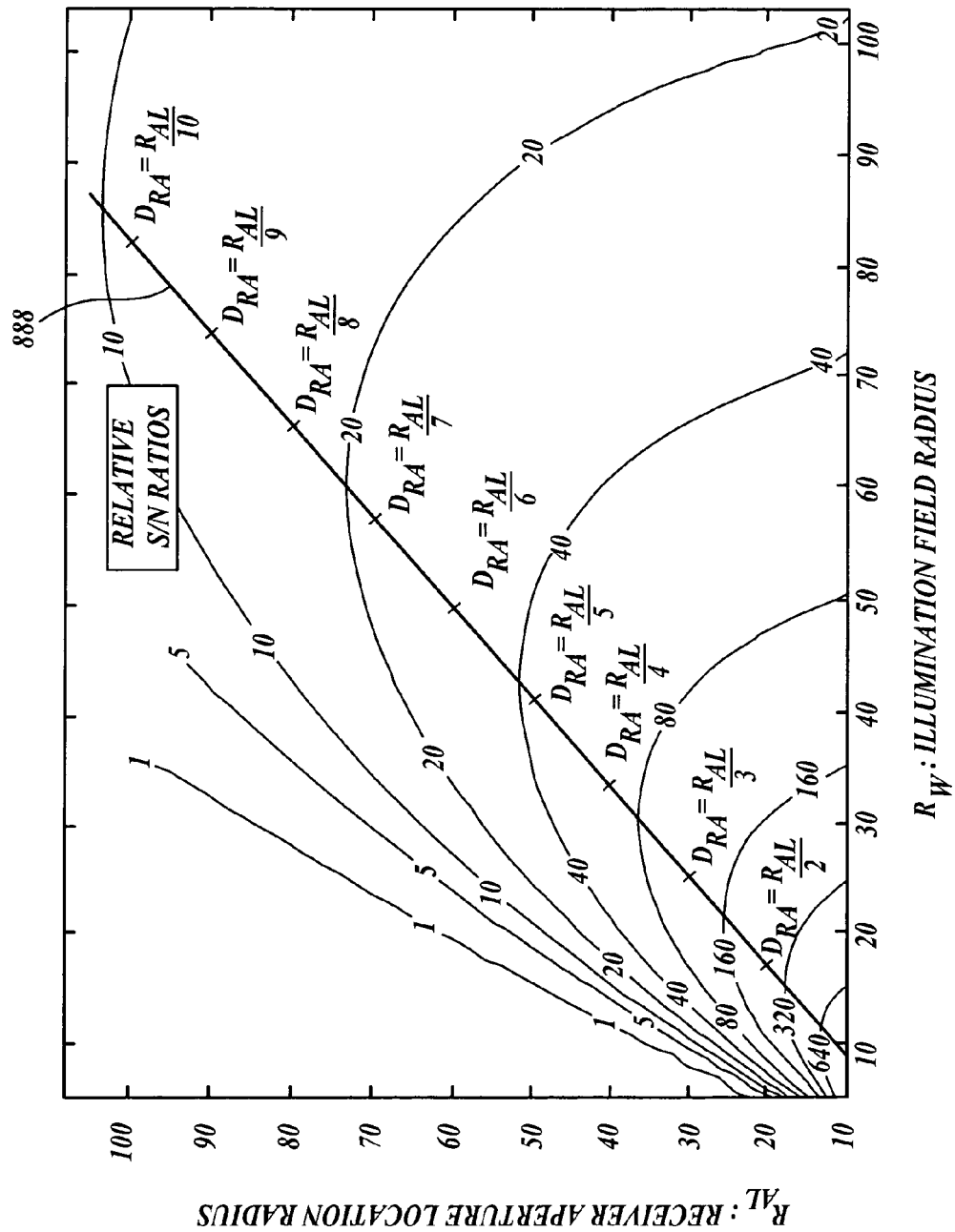
FIG. 8 is a diagram showing representative signal-to-noise ratios that result for various receiver aperture diameters when the receiver aperture of a fiber optic detector channel is positioned at various radii from the center of an illumination field, for an absolute position fiber optic readhead portion arrangement approximately corresponding to FIGS. 1, 2, 3, 5, 6 and 7.

The following table defines the symbols used in EQUATION 9, and also includes typical values used to determine the results shown on FIG. 8, where applicable.

TABLE 1

| Symbol | Description | Value |
|---|---|---|
| S | Signal Power | Dependent, result |
| P | Laser Power (see FIG. 4) | 20 mW |
| C | Fiber Coupling interface loss | 0.9 |
| $g_1$ | Scale Efficiency (reflection loss) | 0.5 |
| $g_2$ | Phase Mask loss (filtering) | 0.8 |
| D | Divergence loss: Geometric effects including Gaussian beam effects. | Dependent: as described above |
| $R_d \times G_d$ | Photodetector and Preamp: Responsivity × Gain (see FIG. 4) | 16 V/mW |

A value of 0.05 mV may be taken as a typical electronic system noise value in a suitable fiber optic readhead signal processing remote electronics, such as that shown in FIG. 4.

FIG. 8 is a diagram showing representative relative signal to noise ratios that result for various receiver aperture diameters $D_{RA}$ when the receiver aperture of a fiber optic detector channel is positioned at various receiver aperture location radii $R_{AL}$ from the center of an illumination field, approximately corresponding to the generic fiber optic readhead arrangement described above with reference to FIG. 3. The illumination field radius $R_W$, shown on the horizontal axis in FIG. 8, is comparable to the radius of an illumination field such as the illumination field 256 described above. For a Gaussian beam profile, the edge of the beam or the resulting illumination field is not well defined. In this case, $R_W$ is defined as the radius in the illumination field where the local beam intensity is one-half the local intensity at the illumination field center. According to this definition, there is significant illuminance beyond the radius $R_W$, but 99% of the total beam energy falls within a radius of approximately 2.55 $R_W$. The receiver aperture location radius $R_{AL}$, shown on the vertical axis in FIG. 8, and the receiver aperture diameter $D_{RA}$ shown at various locations in FIG. 8 have been previously defined with reference to FIGS. 5 and 6.

It should be appreciated that the results of FIG. 8 depend on the ratios between various dimensions, not the particular dimensions themselves. Therefore, the length unit used for the axes shown in FIG. 8 is arbitrary. The ratios become meaningful in design, when one element of the ratio is selected or constrained to a particular dimension for various reasons. Then the particular dimension of the complementary factor can be chosen accordingly. The line 888 includes reference marks and corresponding labels for various receiver aperture diameter values $D_{RA}$. To preserve the generality of FIG. 8, the receiver aperture diameter values $D_{RA}$ are given as a proportion of their corresponding receiver aperture location radius $R_{AL}$.

It should be appreciated that because the S/N ratios shown in FIG. 8 are relative S/N ratios, FIG. 8 can be taken to reflect the relative S/N ratio behavior for a single "ideal" detector channel, or for an optically combined "balanced pair" of detector channels, or the like. That is, while a different set of estimated design values and/or assumptions, such as a lower laser power, a higher noise value, or optically combining 2 or more receiver channel signals, will affect the quantitative values of an estimated S/N ratio, each set of assumptions will affect each assumed signal in approximately the same manner. Thus, the qualitative or relative S/N ratios shown at various locations throughout FIG. 8 remain valid design guides for making reasonable relative design choices and tradeoffs, even when the design values outlined above are varied. It should also be appreciated that the actual position determination results from a readhead according to this invention may also be degraded by a great number of other factors such as the balance between various phase signals, spatial harmonics in the phase signals, contamination, misalignment and the like. Furthermore, in a readhead with multiple readhead portions according to the principles of this invention, according to practical and economical design choices, as described above, a single light source/lens 477 may be used for 2 or more readhead portions. This divides the available laser power (as shown in Table 1, for example) among the various readhead portions, lowering the signal to noise ratio. Nevertheless, the relative S/N ratios shown in FIG. 8 provide very useful design guidelines, especially for determining the relative performance potential of various design tradeoffs in various reasonable and similar designs. It should be appreciated that one of ordinary skill in the art can perform suitable readhead experiments to verify a quantitative S/N ratio corresponding to a particular location in FIG. 8, and then scale that result using the relative S/N ratios of FIG. 8 to approximately estimate quantitative results associated with other "design regions" in FIG. 8. For example, the inventor has experimentally demonstrated stable position readings at a resolution of 1 nanometer using a scale having an 8 micron grating pitch with a balanced pair arrangement of the receiver apertures where the receiver aperture diameter $D_{RA}$ is approximately equal to the receiver aperture location radius $R_{AL}$. This is indicative that a readhead designed according to the principles of this invention can produce a signal to noise ratio that is quantitatively very high, in this "design region" of FIG. 8. Furthermore, importantly, based on such an experimental results and FIG. 8, one may estimate the approximate relative quantitative performance of a various other similar readhead designs according to this invention, where the design factors correspond to other design regions in FIG. 8.

In FIG. 8 various relative S/N ratio results are shown along various relative S/N ratio "isocurves", for various combinations of values of $R_W$ and $R_{AL}$. On each relative S/N isocurve there is a "peak" corresponding to the maximum value for $R_{AL}$ that is usable to obtain the relative S/N ratio of that relative S/N isocurve. Each relative S/N isocurve peak shown in FIG. 8 corresponding to the "maximum value" for the receiver aperture location radius $R_{AL}$, occurs at the illumination field radius $R_W$ which is optimum for that particular value of $R_{AL}$. The line 888 runs through all such relative S/N isocurve peaks. It should be appreciated that any particular receiver aperture location radius $R_{AL}$ (a horizontal line in FIG. 8) intersects with a corresponding point on the line 888. Any deviation of the illumination field radius $R_W$ (a vertical line in FIG. 8) that corresponds to that same point on the line 888 will produce a lower relative S/N ratio and worse performance for that particular receiver aperture location radius $R_{AL}$.

It should appreciated that to provide high resolution and accuracy based on the sinusoidal signals provided by a fiber optic readhead according to this invention, it is desirable not only to count the number of wavelengths or scale pitch units accumulated, it is also desirable to interpolate within the "initial" and "most recent" wavelength to as high a degree as possible. For example, generally, a higher the degree of allowable interpolation corresponds to greater allowable ratios between the coarse, medium and fine mode wavelengths, as previously described. This is desirable for extending the absolute measuring range relative to a given fine mode resolution and accuracy. Generally, for the fiber optic self-imaging readheads disclosed in the incorporated '312 Application and herein, high quality sinusoidal signals are provided and the interpolation level corresponds roughly to the S/N ratio. That is, with a S/N ratio of 1000, for example, approximately $1/1000^{th}$ of the peak-to-peak sinusoidal signal may potentially be discriminated. Considering that the inventor has experimentally demonstrated stable position readings at a resolution of 1 nanometer using a scale having an 8 micron grating pitch, even considering the known sources of error that are to arise in the sinusoidal signals of practically-applied self-imaging readheads, the experimental performance described above corresponds to sinusoidal signal variations that vary from an ideal sinusoidal variation by a ratio of at most 1/64 of the peak-to-peak variation of those sinusoidal signals. It should be appreciated that for the readheads disclosed herein, such performance allows design tradeoffs related to component choice, cost reduction, or manufacturability or the like, which according to FIG. 8 may reduce the S/N ratio, yet still result in desirable absolute measurement readheads. In such embodiments, the sinusoidal signal variations may vary from an ideal sinusoidal variation by a ratio of up to 1/32, or even up to 1/16, of the peak-to-peak variation of those sinusoidal signals and still result in a useful miniature absolute fiber optic readhead according to the principles of this invention.

The relative S/N ratio results shown in FIG. 8, based on the previously described assumptions and design values, indicate that regardless of the receiver aperture diameter $D_{RA}$, for a given receiver aperture location radius $R_{AL}$ the best "half-maximum" illumination field radius $R_W$ is approximately equal to $0.83*R_{AL}$. FIG. 8 further indicates that reducing the "half-maximum" illumination field radius $R_W$ to approximately $0.5*R_{AL}$, or increasing the "half-maximum" illumination field radius $R_W$ to approximately $1.7*R_{AL}$, produces an S/N ratio that is approximately one-half of that provided at $0.83*R_{AL}$, which is a significant and undesirable reduction of the S/N ratio in various exemplary embodiments according to this invention. Thus, in various exemplary embodiments according to this invention, the "half-maximum" illumination field radius $R_W$ is equal to at least $0.5*R_{AL}$ and equal to at most $1.7*R_{AL}$. Alternatively, since 99% of the total beam energy falls within a radius of approximately $2.55 R_W$ as previously indicated, this same design relationship may also be expressed as follows: In various exemplary embodiments according to this invention, 99% of the total beam energy falls within a total illumination field radius at the operable self imaging plane and/or phase mask plane, where the total illumination field radius is equal to at least $0.5*R_{AL}*2.55$, that is, approximately $1.28*R_{AL}$ and equal to at most $1.7*R_{AL}*2.55$, that is, approximately $4.34*R_{AL}$. However, it should be appreciated that in various other exemplary embodiments, a self-imaging fiber optic readhead according to this invention retains various advantages even when the receiver illumination field radius $R_W$ is less than $0.5*R_{AL}$ or more than $1.7*R_{AL}$. For example, particularly advantageous assembly methods and small size are possible with a self-imaging fiber optic readhead according to this invention, as described further below.

The results shown in FIG. 8 also indicate the relative S/N ratio effect of the receiver aperture diameter $D_{RA}$ in relation to a receiver aperture location radius $R_{AL}$. It should be appreciated that according to the assumptions and definitions used herein, a receiver aperture location radius $R_{AL}$ will not generally be less than one-half $D_{RA}$. Furthermore, for a close-packing assembly arrangement using a source fiber that is the same diameter as the receiver fibers, such as shown in FIGS. 5 and 6, the receiver aperture location radius $R_{AL}$ is approximately equal to $D_{RA}$. As shown along the line 888, a relative S/N ratio of greater than 640 is indicated where the receiver aperture diameter $D_{RA}$ approaches a value approximately equal to the receiver aperture location radius $R_{AL}$. As previously discussed, experimentally, the inventor has demonstrated stable position readings at a resolution of 1 nanometer using a scale having an 8 micron grating pitch with a readhead arrangement where the receiver aperture diameter $D_{RA}$ is approximately equal to the receiver aperture location radius $R_{AL}$.

As shown along the line 888, when the ratio of the receiver aperture diameter $D_{RA}$ to the receiver aperture location radius $R_{AL}$ is reduced to approximately 1/3, a relative S/N ratio a little greater than 100 is provided according to the assumptions used to determine the results shown in FIG. 8, that is, the relative S/N ratio is at least 6 times worse than when the receiver aperture diameter $D_{RA}$ approaches a value approximately equal to the receiver aperture location radius $R_{AL}$. In various exemplary embodiments according to this invention, it is undesirable to settle for poorer levels of potential signal and the resulting performance. Thus, in various exemplary embodiments according to this invention, a receiver aperture diameter $D_{RA}$ should be greater than or equal to 1/3 of that receiver aperture's location radius $R_{AL}$.

As shown along the line 888, when the ratio of the receiver aperture diameter $D_{RA}$ to the receiver aperture location radius $R_{AL}$ drops further to approximately 1/5, the relative S/N ratio drops by an additional factor of approximately 2. That is, as the ratio $D_{RA}/R_{AL}$ drops from 1/3 to 1/5, the potential performance in a fiber optic readhead according to this invention drops by a factor of approximately two. However, relaxing the $D_{RA}/R_{AL}$ ratio to this level may allow useful design flexibility and/or more economical components or assembly, while still allowing submicron-level performance along with the miniature size and various other advantages available with a self-imaging fiber optic readhead according to this invention. Therefore, in various other exemplary embodiments according to this invention, a receiver aperture diameter $D_{RA}$ should be greater than or equal to 1/5 of that receiver aperture's location radius $R_{AL}$.

As the ratio $D_{RA}/R_{AL}$ drops further from 1/5 to 1/8, the S/N ratio drops by a further factor of approximately 2 to 3. However, relaxing the $D_{RA}/R_{AL}$ ratio to this level may allow still more useful and economical design and assembly flexibility, while still allow micron-level performance along with the miniature size and various other advantages available with a self-imaging fiber optic readhead according to this invention. Therefore, in various other exemplary embodiments according to this invention, a receiver aperture diameter $D_{RA}$ should be greater than or equal to 1/8 of that receiver aperture's location radius $R_{AL}$.

When the receiver aperture diameter $D_{RA}$ drops to less than 1/8 of that receiver aperture's location radius $R_{AL}$, the performance potential of a self-imaging fiber optic readhead according to this invention is in some instances not remarkable compared to other much larger commercially available encoder read heads, but its size remains remarkable in comparison to such encoder readheads. Furthermore, its size, and/or resolution and accuracy, and/or robustness of operation remain remarkable compared to prior art fiber encoders which use other physical or optical principles. Furthermore, particularly advantageous assembly methods are possible with a self-imaging fiber optic readhead according to this invention, as described further below. Thus, in various exemplary embodiments, a self-imaging fiber optic readhead according to this invention retains various advantages even when the receiver aperture diameter $D_{RA}$ drops to less than 1/8 of that receiver aperture's location radius $R_{AL}$.

The inventor has also determined that relatively ideal self-images are present only relatively close to the center of an illumination field arising from a light source that is a point source in various exemplary embodiments according to this invention. In such cases, as a receiver aperture's location radius $R_{AL}$ is increased, the available self-image according to this invention exhibits increasingly non-ideal changes in visibility and spatial phase at increasing radius from the center of the illumination field. Indeed, the most widely known references on self-imaging make assumptions that restrict their validity to the center of a self-image illumination field. Thus, without negating the validity of the foregoing discussion regarding S/N ratios in a self-imaging fiber optic readhead according to this invention, in various exemplary embodiments, the receiver aperture's location radius $R_{AL}$ is also made as small as other design, assembly and cost tradeoffs allow.

It should be appreciated that for configurations with relatively lower signal to noise ratios, accurate interpolation levels are reduced. Thus, the wavelength of the scale grating tracks that provide the fine, medium and coarse wavelengths as outlined above must be adjusted to provide reliable absolute measurement error margins according to the discussion related to EQUATIONS 3–8 above. Generally, this means that the respective wavelengths must be made relatively more different from each other, resulting in a reduced absolute measuring range, which may nonetheless be useful in a number of readhead applications.

Figure 9:
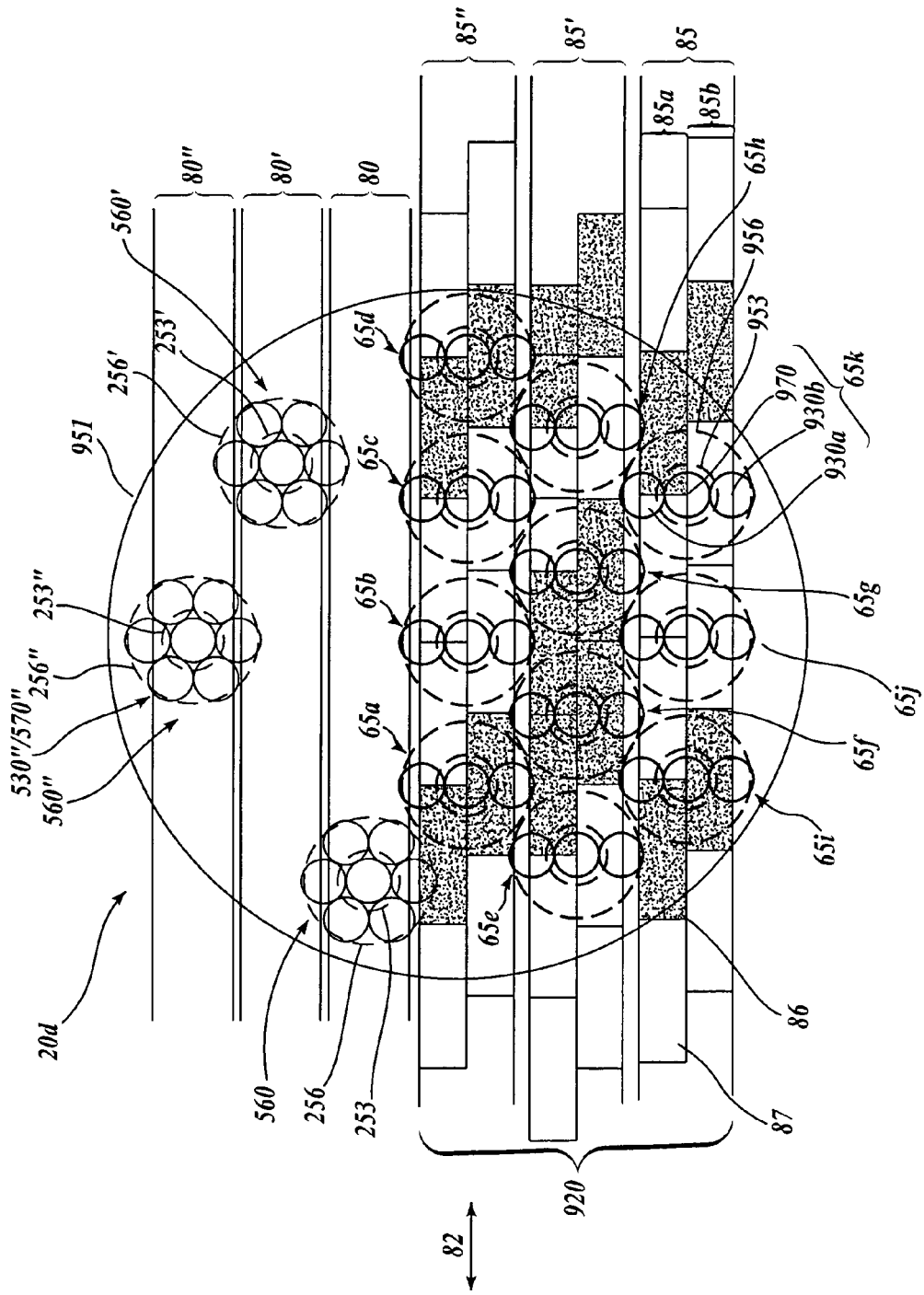
FIG. 9 is a schematic end view of a fifth generic embodiment of an absolute position fiber optic readhead arrangement according to this invention which includes a binary code track portion.

FIG. 9 is a schematic end view of a fifth generic embodiment of an absolute position fiber optic readhead arrangement according to this invention which includes a binary code track arrangement including eleven individual binary detector portions. As shown in FIG. 9, a readhead arrangement 20d is arranged with a circular/cylindrical space 951 that fits within a ferrule analogous to the ferrule 540. The layout of the readhead arrangement 20d includes three readhead portions 560, 560' and 560" which are constructed and function similarly to the similarly numbered readhead portions described with reference to FIGS. 5 and 6, except in the exemplary embodiment shown in FIG. 9, they are located in different relative positions. It should be appreciated that various features of the readhead portions 560, 560' and 560", such as the phases masks, have been previously described and are not shown in FIG. 9, so that certain other features of the readhead arrangement 20d are depicted more clearly. The location of the readhead portion 560" is represented by the outlines of the optical fibers 530"/570". The readhead portion 560" provides an illumination spot 253" centered on the scale track 80" and light is reflected from the scale track 80" to provide an illumination field 256", according to previously described principles of operation. The readhead portions 560' and 560 are similarly represented and operate similarly. It should be appreciated that the exemplary layout of the readhead portions 560, 560' and 560" shown in FIG. 9 is just one of many possible configurations that operably and compactly position those readhead portions relative to the corresponding scale tracks. Many alternative arrangements are possible.

The layout of the readhead arrangement 20d further includes eleven binary detector portions 65a–65k, each of which is constructed and operates similarly to the binary detector portion 65k. The binary detector portion 65k includes a source fiber 970 that may be identical to the source fiber 570, and two receiver fibers 930a and 930b that may be identical to the receiver fibers 530. Alternatively, the distribution and collection of light for the eleven binary detector portions 65a–65k is not as critical as that for the readhead portions 560, 560' and 560", thus various different fibers may be used for the source and receiver fibers 970, 930a and 930b. In any case, the source fiber 570, and the two receiver fibers 930a and 930b may be suitably positioned in similar diameter holes or slots fabricated in a readhead ferrule by drilling, EDM, or the like. The binary detector portion 65k includes no masks. The source fiber 970 provides an illumination spot 953 centered at the boundary between two binary scale subtracks 85a and 85b of a binary scale track 85, and light is reflected from the binary scale track 85 to provide an illumination field 956. In the vicinity of the receiver fiber 930a, the illumination field 956 primarily includes light reflected from the binary scale subtrack 85a. In the vicinity of the receiver fiber 930b, the illumination field 956 primarily includes light reflected from the binary scale subtrack 85b.

Each of the subtracks 85a and 85b include relatively more reflective "bright" elements 86 and relatively less reflective "dark" elements that provide binary optical signals in the receiver fibers 930a and 930b. In the exemplary embodiment shown in FIG. 9, the binary scale subtracks 85a and 85b are redundant scale tracks that include the same sequence of code bits according to known 3-bit pseudo-random "chain" code techniques, or the like. The sequence of the binary scale subtracks 85a and 85b are shifted by one-half bit length relative to each other. With such a configuration, when the optical signal at one of the receiver fibers of a binary detector portion is undefined, such as the situation shown in FIG. 9 for the receiver fiber 930a of the binary detector portion 65k, the optical signal at the other one of the receiver fibers of a binary detector portion will be well defined, such as the situation shown in FIG. 9 for the receiver fiber 930b of the binary detector portion 65k.

It should be appreciated that the binary detector portions 65a–65d and the binary scale track 85″ provide an additional 4-bit code according to known pseudo-random "chain" code techniques, or the like, as do the binary detector portions 65e–65h and the binary scale track 85′. Thus, all together, the "11-bit" binary code portion 920 can provide approximately 2048 unique code combinations. The bit length and the spacing of the binary detector portions 65a–65k along the measuring axis direction 82 are chosen to be less than the coarse wavelength provided by the three readhead portions 560, 560′ and 560″, as outlined above with reference to EQUATIONS 3–8. Thus, each step of the total binary code corresponds to a particular coarse wavelength, which extends the absolute measuring range to a length determined by the physical length of total binary code sequence. Once the position value of a particular wavelength is determined based on the corresponding total binary code, the position value is refined by determining the position within that coarse wavelength, as previously described.

In one exemplary embodiment, the bit length and the spacing of the binary detector portions 65a–65k are chosen to be in the range of 0.8 to 1.0 mm, which is conservatively less than the coarse wavelength provided by previously described exemplary readhead portions usable for the readhead portions 560, 560′ and 560″. In such a case, an absolute measuring range of approximately 2 meters can be provided with a total readhead diameter of approximately five mm, for a readhead arrangement approximately like the readhead arrangement 20d shown in FIG. 9. At the same time, the measuring resolution can be on the order of nanometers, as previously described.

It should be appreciated that in order to reliably use such a relatively crude and economical binary code track portion to provide an extended absolute measuring range, it is necessary to achieve a relatively coarse wavelength that is safely at least equal to or longer than the binary bit length using the readhead portions 560, 560′ and 560″, with due consideration to all potential error sources. Accordingly, when high measuring resolution is also to be provided, the relatively short grating pitches and the high accuracy interpolation provided by the fiber optic readhead portions 560, 560′ and 560″ according to the principles of this invention and as taught in the incorporated '312 Application, allow an absolute fiber optic readhead with an unprecedented combination of size, range and resolution. It should be appreciated that the exemplary layout of the binary code portion 920 shown in FIG. 9 is exemplary only and not limiting. It is one of many possible configurations that operably and compactly position operable binary detector portions relative to the corresponding scale tracks. Many alternative arrangements are possible. It should be appreciated that due to the extremely high speed modulation potential of the all-optical light sources and receiver channels/fibers, it is also possible design a more compact readhead configuration than that shown in FIG. 9, wherein the various illumination fields overlap the receivers of multiple readhead portions, but the sources and receivers of each respective readhead portion are operated individually and sequentially in time such that signal interference between adjacent readhead portions is prevented. In such time-multiplexed embodiments, it should be appreciated the readhead design can be made as compactly as allowed by the physical sizes of the various readhead components.

Figure 10:
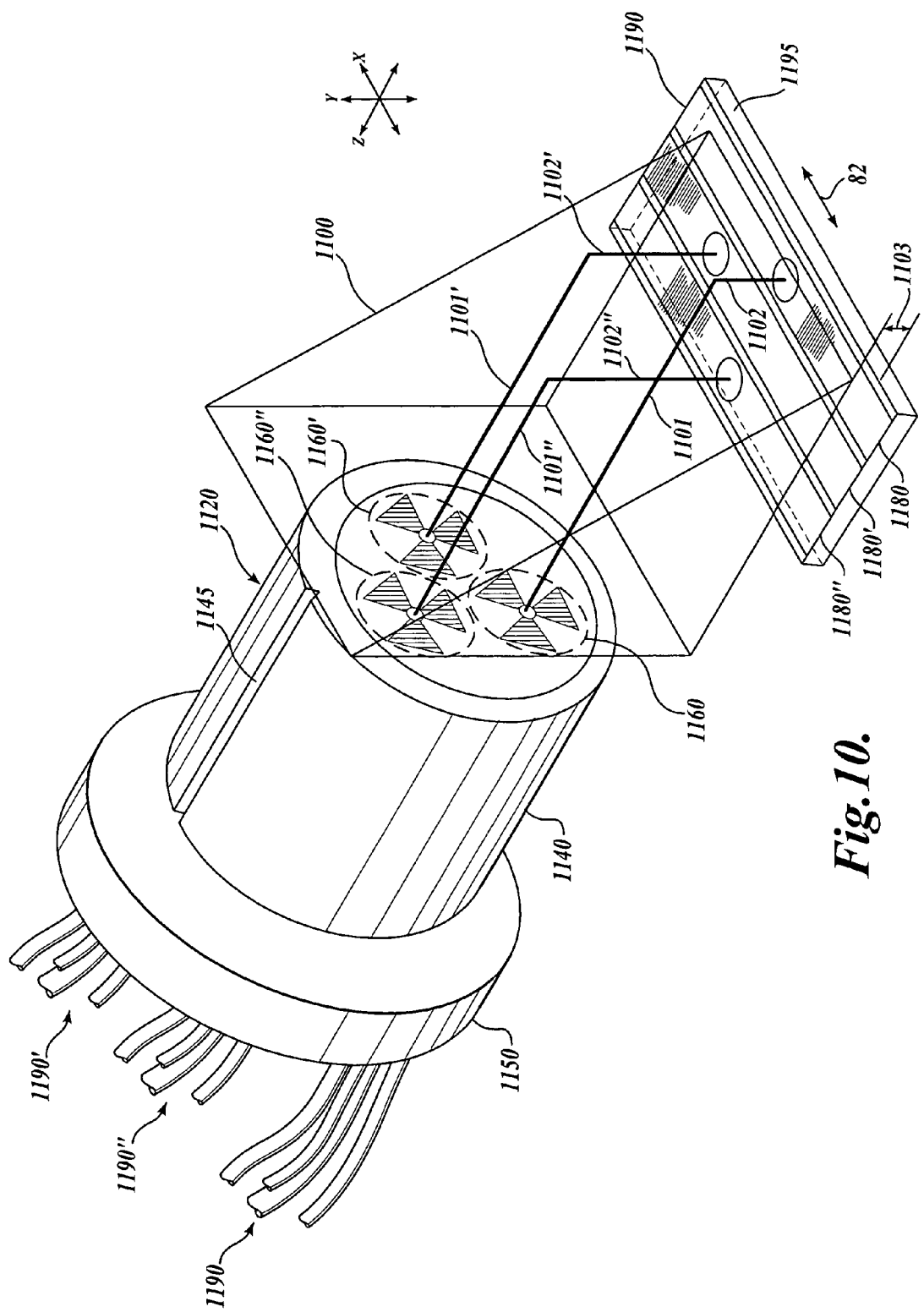
FIG. 10 shows an optical deflector useable in conjunction with various absolute position fiber optic readhead arrangements according to this invention.

FIG. 10 shows an optical deflector 1100 usable in conjunction with various fiber optic readheads according to this invention, in one exemplary orientation relative to scale grating tracks 1180. As shown in FIG. 10, a generic exemplary optical fiber readhead arrangement 1120 includes readhead portions 1160, similar to the optical fiber readhead portions 60 previously described with reference to FIG. 3. The readhead portions 1160 transmit a diverging source light generally along a beam path 1101 to the optical deflector 1100, where it is deflected along a beam path 1102 and through an operating gap 1103 towards a scale grating track 1180. Similarly, scale light reflecting, diverging and diffracting from the scale grating track 1180 is returned to the optical deflector 1100 generally along the beam path 1102 and deflected back towards the readhead portion 1160 generally centered along the nominal beam path 1101. The scale grating track 1180 moves relative to the optical fiber readhead arrangement 1120 and the deflector 1100 along the measuring axis direction 82. The returned scale light provides a self-image of the scale grating track 1180 at a self-image plane in an illumination field that is generally centered with respect to the fiber optic receiver channel configuration of the exemplary optical fiber readhead arrangement 1120, as previously described with reference to various other exemplary embodiments according to this invention. It should be appreciated that the grating bars of the phase masks of the exemplary optical fiber readhead arrangement 1120 are oriented such that they are parallel to the grating lines in the self-image of the scale grating track 1180. It should also be appreciated that the more accurately the deflector 1100 deflects the beam path 1101 relative to a nominal deflection of 90 degrees to become the beam path 1102, and the more accurately the beam path 1102 is made normal to the surface of the scale grating track 1180, the more accurate and robust will be the resulting position measurement system.

In various exemplary embodiments, the deflector 1100 is a reflecting right angle prism, mirror, or other suitable optical component reliably mounted on a separate member in a fixed relation relative to a fiber optic readhead according to this invention. In order to maintain a short path length operable for self-imaging, and still maintain a practical operating gap relative to the scale grating tracks 1180, the deflector 1100 is preferably mounted as close as possible to the readhead portions 1160. It should be appreciated that in various exemplary embodiments, the deflector 1100 may require an increased total self-imaging distance relative to a readhead configuration without a deflector, which may also relatively increase the total divergence of the light from the light source and scale. Thus, in such cases, care should be taken to adjust the various readhead design parameters to maintain design relationships according to the principles of this invention and as disclosed in the '312 Application. In various exemplary embodiments, the deflector 1100 is properly aligned and attached directly to the ferrule 1140. In various other exemplary embodiments, the deflector 1100 may also act as a substrate to provide a phase mask element according to this invention, having phase masks according to this invention formed directly onto the surface of the deflector 1100 that is positioned towards the ferrule 1140.

In the embodiment shown in FIG. 10, the optical fiber readhead arrangement 1120 is oriented with its long axis transverse to the direction of the measuring axis 82 of the scale grating tracks 1180. Either the ferrule 1140 or the scale grating tracks 1180 may be fixed in position, with the other element moveable. It will be appreciated that in numerous applications it is practical to use a deflector such as the exemplary deflector 1100 in this manner because of the ultraminiature size of a fiber optic readhead and encoder according to this invention. It will also be appreciated that in numerous applications a deflector such as the exemplary deflector 1100 further enhances the utility of a fiber optic readhead and encoder according to this invention by allowing the fiber optic readhead to be flexibly oriented relative to the scale grating tracks 1180 and the measuring axis direction 82, such that the largest and narrowest dimensions of the readhead are oriented in desired directions. It will further be appreciated that use of a deflector such as the exemplary deflector 1100 is beneficial for orienting the route of the optical fibers and/or cables of the readhead arrangement 1120 in desired directions.

For example, the readhead cable can be directed orthogonal to the scale as shown in FIG. 10, or it can alternatively be aligned approximately parallel the scale tracks when the ferrule is rotated with respect to the deflector by 90 degrees about the z axis, such that the bars of the phase masks remain parallel to those in the scale track self-images.

It should also be appreciated that any of the readhead embodiments shown, described or taught herein can also be adapted to provide an absolute measurement system analogous to any of the circular or cylindrical rotary absolute position readhead arrangements as taught in the incorporated '312 Application. A circular rotary embodiment may be understood by considering the segment of scale shown in FIG. 10 to carry scale grating tracks which are segments of a relatively planar rotary grating scale that rotates about an axis parallel to the y-axis. In such a case, the measuring axis 82 follows a relatively planar circular path in the X-Z plane. A cylindrical rotary embodiment may be understood by considering the segment of scale shown in FIG. 10 to carry scale grating tracks which are segments of a relatively cylindrical grating scale that rotates about an axis parallel to the z-axis. In such a case, the measuring axis 82 follows a relatively cylindrical circular path that is circular in the X-Y plane.

While this invention has been described in conjunction with the exemplary embodiments outlined above, it is evident that the embodiments and design factors described above are indicative of additional alternative embodiments, modifications and variations, as will be apparent to those skilled in the art. Accordingly, the embodiments of the invention, as set forth above, are intended to be illustrative, not limiting. Various changes may be made without departing from the spirit and scope of the invention.

The embodiments of the invention in which an exclusive property or privilege is claimed are defined as follows:

1. An absolute measuring device for measuring the relative position between two members, the device comprising:
   a scale having at least first and second scale gratings, the first scale grating formed along a first track and having a first grating pitch, and the second scale grating formed along a second track and having a second grating pitch, each track extending along a measuring axis direction; and
   a readhead comprising at least a first self-image readhead portion corresponding to the first scale grating and a second self-image readhead portion corresponding to the second scale grating, each self-image redhead portion operable to provide an operable self-image of the corresponding one of the scale gratings, each self-image readhead portion comprising:
      a light source portion comprising at least one light source element; and
      a plurality of fiber-optic receiver channels, each respective fiber-optic receiver channel comprising:
         a spatial phase mask portion having a respective spatial phase provided by a plurality of light-blocking elements, the plurality of light-blocking elements being arranged at a spatial phase mask plane of the self-image readhead portion and with a light-blocking element pitch that are operable for spatially filtering the operable self-image of the corresponding one of the scale gratings; and
         at least one optical fiber having an input end arranged to receive receiver channel optical signal light;
   through the spatial phase mask portion, the optical signal light collected over a collected light area having a dimension along the measuring axis direction that is at least one full period of the spatial phase mask portion,
   wherein, when the self-image readhead is operably positioned relative to the scale gratings:
      at least first and second respective fiber-optic receiver channels of the first self-image readhead portion spatially filter the operable self-image of the first scale grating to provide a plurality of respective receiver channel optical signals having respective optical signal phases;
      that are output along respective optical fibers to provide relative displacement measurement information in the form of a first plurality of optical output signals, the first plurality of optical output signals arising from spatially filtered scale light without the use of an electronic photodetector element; and
      wherein the first plurality of optical output signals are usable to determine a first fine resolution incremental measurement value that corresponds to a position along the first scale grating;
   at least first and second respective fiber-optic receiver channels of the second self-image readhead portion spatially filter the operable self-image of the second scale grating to provide a plurality of respective receiver channel optical signals having respective optical signal phases that are output along respective optical fibers to provide relative displacement measurement information in the form of a second plurality of optical output signals, the second plurality of optical output signals arising from spatially filtered scale light without the use of an electronic photodetector element; and wherein the second plurality of optical output signals are usable to determine a second fine resolution incremental measurement value that corresponds to a position along the second scale grating;
   at least a first relationship between the first fine resolution incremental measurement value and the second fine resolution incremental position measurement value has a unique value at each position within a first relationship wavelength along the measuring axis direction, wherein the first relationship wavelength is longer than each of the first and second grating pitches, and a first relatively coarser resolution absolute position measurement can be determined at each position within the first relationship wavelength based on the unique value of the first relationship; and
   the first relatively coarser resolution absolute position measurement is combinable with at least one of the first and second fine resolution incremental measurement values to provide a fine resolution absolute position measurement at each position within the first relationship wavelength.

2. The absolute measuring device of claim 1 wherein the spatial phase mask plane of each self-image readhead portion nominally comprises a single spatial phase mask plane for the entire readhead.

3. The absolute measuring device of claim 1 wherein for each self-image readhead portion at least each collected light area and each input end are positioned entirely within a cylindrical volume having an axis perpendicular to the respective spatial phase mask plane and having a cylinder radius that is at most 3 millimeters.

4. The absolute measuring device of claim 3 wherein:
the spatial phase mask plane of each self-image readhead portion nominally comprises a single spatial phase mask plane for the entire readhead;
the readhead comprises a transparent mask substrate; and
for each self-image readhead portion:
   each receiver channel spatial phase mask portion is fabricated on a surface of the transparent mask substrate with its light-blocking elements positioned along the measuring axis direction with respect to a nominal self-image pitch of the operable self-image of the corresponding one of the scale gratings, and with respect to the light-blocking elements of the other receiver channel spatial phase mask portions of that self-image readhead portion, in a manner that establishes desired relationships between the respective spatial phases of the receiver channel spatial phase mask portions; and
   each receiver channel spatial phase mask portion is positioned entirely within the respective cylindrical volume of that self-image readhead portion.

5. The absolute measuring device of claim 4 wherein the input end of each receiver channel optical fiber is nominally positioned against a corresponding receiver channel spatial phase mask portion on the surface of the transparent mask substrate.

6. The absolute measuring device of claim 3 wherein the cylinder radius of each respective cylindrical volume containing at least the collected light area and input end is at most 2.0 millimeters.

7. The absolute measuring device of claim 6 wherein the cylinder radius of each respective cylindrical volume containing at least the collected light area and input end is at most 1.0 millimeter.

8. The absolute measuring device of claim 3 wherein for each self-image readhead portion:
for each respective fiber-optic receiver channel the collected light area dimension along the measuring axis direction is at least three full periods of the spatial phase mask portion;
each light source element comprises a source optical fiber comprising a single-mode optical fiber, with light originating from a remote light source being output from a core area at an output end of the source optical fiber; and
the output end of each source optical fiber is positioned entirely within the cylindrical volume.

9. The absolute measuring device of claim 8 wherein for each self image readhead portion:
each light source portion comprises a single source optical fiber; and
each respective fiber-optic receiver channel optical fiber is arranged in a close pack arrangement around the source optical fiber.

10. The absolute measuring device of claim 9 wherein for each self-image readhead portion the plurality of fiber-optic receiver channels comprise at least 2N respective fiber-optic receiver channels arranged in an arrangement of N operable pairs, where N is an integer equal to at least 2, and each operable pair comprises two respective fiber-optic receiver channels arranged on opposite sides of the source optical fiber, wherein the two spatial phase mask portions corresponding to those two respective fiber-optic receiver channels have one of (a) the same spatial phase and (b) spatial phases that nominally differ by 180 degrees.

11. The absolute measuring device of claim 3 wherein the axes of the respective cylindrical volumes of at least two self-image readhead portions are offset from each other along the measuring axis direction and those axes are offset from each other by less than the sum of their respective cylinder radii along the direction perpendicular to the measuring axis direction.

12. The absolute measuring device of claim 11 wherein the readhead comprises at least three self-image readhead portions and the axes of the respective cylindrical volumes of at least two self-image readhead portions are not offset from each other along the measuring axis direction and those axes are offset from each other by at least the sum of their respective cylinder radii along the direction perpendicular to the measuring axis direction.

13. The absolute measuring device of claim 3 wherein the respective cylindrical volumes of all the self-image readhead portions fit within an overall cylindrical volume having an axis parallel to the respective cylindrical volumes, the overall cylindrical volume having an overall cylinder radius that is at most 9 mm.

14. The absolute measuring device of claim 13 wherein the overall cylinder radius is at most 5 mm.

15. The absolute measuring device of claim 14 wherein the overall cylinder radius is at most 2.5 mm.

16. The absolute measuring device of claim 15 wherein the overall cylinder radius is at most 1.25 mm.

17. The absolute measuring device of claim 3 wherein when the readhead is operably positioned relative to the scale gratings:
for each self-image readhead portion a total illumination circle may be defined at its spatial phase mask plane such that at least 95% of the optical power included in the operable self-image due to the light source portion of that self-image readhead portion is included in that total illumination circle, that total illumination circle having a corresponding total illumination radius; and
the axis of the cylindrical volume of each self-image readhead portion is spaced apart from the axis of the cylindrical volume of its closest neighboring self-image readhead portion by a distance that is at least as large as the sum of the their total illumination radii.

18. The absolute measuring device of claim 3 wherein, for each of at least two self-image readhead portions:
each light source element included in the self-image readhead portion comprises a source optical fiber and light originating from a controllable remote light source corresponding to that self-image readhead portion is output from an output end of the source optical fiber; and
the light originating from the controllable remote light source is controlled to be intermittently on and off, such that for at least part of a time period when one of the two self-image readhead portions is outputting respective optical output signals, the other of the two self-image readhead portions is outputting no light.

19. The absolute measuring device of claim 18 wherein when the readhead is operably positioned relative to the scale gratings, for each self-image readhead portion a total illumination circle may be defined at its spatial phase mask plane such that at least 95% of the optical power included in the operable self-image due to the light source portion of that self-image readhead portion is included in that total illumination circle, that total illumination circle having a corresponding total illumination radius; and the axes of the respective cylindrical volumes of the at least two self-image readhead portions are spaced apart from each other by less than the sum of their respective total illumination radii.

20. The absolute measuring device of claim 3 wherein for at least two self-image readhead portions:
the light source portion of a first one of the self-image readhead portions provides a first respective wavelength of light;
the light source portion of a second one of the self-image readhead portions provides a second respective wavelength of light different from the first respective wavelength of light;
each of the first and second self-image readhead portions includes a respective bandpass optical wavelength filter that matches its respective wavelength of light;
each respective bandpass filter is positioned relative to its readhead portion so as to substantially block any light that has a wavelength different from its respective wavelength of light from reaching each collected light area of that readhead portion.

21. The absolute measuring device of claim 20 wherein when the readhead is operably positioned relative to the scale gratings, for each self-image readhead portion a total illumination circle may be defined at its spatial phase mask plane such that at least 95% of the optical power included in the operable self-image due to the light source portion of that self-image readhead portion is included in that total illumination circle, that total illumination circle having a corresponding total illumination radius; and the axes of the respective cylindrical volumes of the at least two self-image readhead portions are spaced apart from each other by less than the sum of their total illumination radii.

22. The absolute measuring device of claim 2 wherein for at least two respective self-image readhead portions:
the light source portion of a first one of the respective self-image readhead portions provides a first respective wavelength of light;
the light source portions of a second one of the respective self-image readhead portions provides a second respective wavelength of light different from the first respective wavelength of light.

23. The absolute measuring device of claim 1 wherein:
each scale grating includes reflective elements;
each light source portion emits source light along a respective source light path having a source light central axis that is oriented to intersect with a scale grating along a direction which is nominally normal to a plane of the scale grating at the point of intersection and
a scale light arising from the source light is reflected along a scale light path having a scale light central axis that is nominally aligned with the source light central axis when the readhead is nominally aligned relative to the scale gratings.

24. The absolute measuring device of claim 23 further comprising a reflective surface, wherein:
the reflective surface is arranged to deflect each source light central axis and each scale light central axis by approximately 90 degrees at a location along the axes between the readhead and the scale gratings; and
the readhead and reflective surface are arranged relative to the scale such that the spatial phase mask planes and the operable self-images of the scale gratings are nominally perpendicular to the plane of the scale gratings.

25. The absolute measuring device of claim 1 wherein the scale is a relatively planar circular scale and the measuring axis direction follows a circular path parallel to the plane of the scale.

26. The absolute measuring device of claim 1 wherein the scale is a relatively cylindrical scale and the measuring axis direction follows a circular path along the circumference of the cylindrical scale.

27. The absolute measuring device of claim 1 wherein:
the scale comprises at least a third scale grating formed along a third track along the measuring axis direction, the third scale grating has a grating pitch that is the same as the grating pitch of the first scale grating, and the first and third scale gratings are located substantially symmetrically on the scale on opposite sides of the second scale grating; and
the readhead comprises at least a third self-image readhead portion, the third self-image readhead portion being similar to the first self-image readhead portion, and the first and third self-image readhead portions are located approximately symmetrically in the readhead on opposite sides of a line extending parallel to the nominal measuring axis direction and through an effective center of the second self-image readhead portion.

28. The absolute measuring device of claim 1 wherein, when there is relative displacement between the readhead and scale grating along the measuring axis direction, each respective optical output signal comprises a sinusoidal variation that is a function of the relative displacement, and each such sinusoidal variation varies from an ideal sinusoidal variation by at most 1/32 of the peak-to-peak variation of each such sinusoidal variation.

29. The absolute measuring device of claim 28 wherein each such sinusoidal variation varies from an ideal sinusoidal variation by at most 1/64 of the peak-to-peak variation of each such sinusoidal variation.

30. The absolute measuring device of claim 1 wherein:
the scale comprises at least a third scale grating formed along a third track along the measuring axis direction;
the readhead comprises at least a third self-image readhead portion;
at least first and second respective fiber-optic receiver channels of the third self-image readhead portion spatially filter the operable self-image of the third scale grating to provide a plurality of respective receiver channel optical signals having respective optical signal phases that are output along respective optical fibers to provide relative displacement measurement information in the form of a third plurality of optical output signals, the third plurality of optical output signals arising from spatially filtered scale light without the use of an electronic photodetector element; and wherein the third plurality of optical output signals are usable to determine a third fine resolution incremental measurement value that corresponds to a position along the third scale grating;
at least a second relationship between the third fine resolution incremental measurement value and one of the first and second fine resolution incremental position measurement values has a unique value at each position within a second relationship wavelength along the measuring axis direction, wherein the second relationship wavelength is longer than a plurality of the first relationship wavelengths, and a second relatively coarser resolution absolute position measurement can be determined at each position within the second relationship wavelength based on the unique value of the second relationship; and the second relatively coarser resolution absolute position measurement is combinable with the first relatively coarser resolution absolute position measurement and at least one of the first, second, and third fine resolution incremental measurement values to provide a relatively finer resolution absolute position measurement over at least a portion of the second relationship wavelength that is longer than a plurality of the first relationship wavelengths.

31. The absolute measuring device of claim 30 wherein:

the scale further comprises at least one binary code track including a sequence of unique binary code words extending along the measuring axis direction;

the readhead further comprises a binary code portion including a plurality of binary detector portions usable to determine the unique binary codeword included on an operably positioned adjacent portion of the binary code track, each unique binary codeword indicative of the absolute position of the readhead relative to the scale at a code track resolution over at least a portion of the length of the binary code track;

the binary code track and the binary code portion are configured such that the code track resolution is sufficient to uniquely identify each period of the second relationship wavelength; and a determined unique binary codeword is combinable with the corresponding second relatively coarser resolution absolute position measurement, the first relatively coarser resolution absolute position measurement and at least one fine resolution incremental measurement value to provide a fine resolution absolute position measurement over at least a portion of the binary code track length that is longer than a plurality of the second relationship wavelengths.

32. The absolute measuring device of claim 1 wherein:

the light source portion of the first self-image readhead portion provides a first wavelength of light;

the light source portion of the second self-image readhead portion provides a second wavelength of light different from the first wavelength of light; and each of the first and second self-image readhead portions output their respective optical output signals to at least one of (a) a respective bandpass optical wavelength filter that matches their respective wavelength of light and (b) a respective photodetector device having an optical wavelength response that effectively matches their respective wavelength of light, such that at least one of the respective bandpass optical wavelength filter and the respective photodetector device effectively stop any light that has a wavelength different from their respective wavelength of light from contributing to electronic signals arising from their respective optical output signals.

* * * * *

UNITED STATES PATENT AND TRADEMARK OFFICE
CERTIFICATE OF CORRECTION

PATENT NO. : 7,053,362 B2  Page 1 of 1
APPLICATION NO. : 10/428238
DATED : May 30, 2006
INVENTOR(S) : J.D. Tobiason et al.

It is certified that error appears in the above-identified patent and that said Letters Patent is hereby corrected as shown below:

| Column | Line | Error |
|---|---|---|
| Title page item (56) Pg. 1, col. 1 | Refs. Cited (U.S. Pats) | insert in appropriate order --5,808,730  9/1998  Danielian et al.-- |
| Title page item (56) Pg. 1, col. 2 | Refs. Cited (Foreign Pats.) | insert in appropriate order --FOREIGN PATENT DOCUMENTS EP  1 382 941  A1  1/2004 JP  59173713       10/1984 JP  01272917       10/1989-- |

Signed and Sealed this

Fourteenth Day of November, 2006

JON W. DUDAS
*Director of the United States Patent and Trademark Office*